US012076817B2

(12) United States Patent
Sakai et al.

(10) Patent No.: US 12,076,817 B2
(45) Date of Patent: Sep. 3, 2024

(54) LASER WELDING DEVICE

(71) Applicant: Panasonic Intellectual Property Management Co., Ltd., Osaka (JP)

(72) Inventors: Toru Sakai, Hyogo (JP); Atsuhiro Kawamoto, Hyogo (JP); Junji Fujiwara, Osaka (JP); Michio Sakurai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 572 days.

(21) Appl. No.: 17/066,913

(22) Filed: Oct. 9, 2020

(65) Prior Publication Data

US 2021/0023656 A1 Jan. 28, 2021

Related U.S. Application Data

(63) Continuation of application No. PCT/JP2019/011483, filed on Mar. 19, 2019.

(30) Foreign Application Priority Data

Apr. 13, 2018 (JP) ................... 2018-077702

(51) Int. Cl.
  *B23K 26/244* (2014.01)
  *B23K 26/10* (2006.01)
  *B23K 26/70* (2014.01)
(52) U.S. Cl.
  CPC .......... *B23K 26/244* (2015.10); *B23K 26/103* (2013.01); *B23K 26/705* (2015.10)

(58) Field of Classification Search
  CPC ... B23K 26/103; B23K 26/705; B23K 26/244
  (Continued)

(56) References Cited

U.S. PATENT DOCUMENTS 4,827,099 A * 5/1989 Krebs .................... C21D 9/505
  219/121.64
6,023,044 A * 2/2000 Kosaka .................. B23K 9/025
  901/42

(Continued)

FOREIGN PATENT DOCUMENTS

CN   102642088    8/2012
CN   107000119    8/2017

(Continued)

OTHER PUBLICATIONS

Office Action issued Apr. 6, 2022 in corresponding Chinese Patent Application No. 201980022373.X, with Search Report.

(Continued)

*Primary Examiner* — Jimmy Chou
(74) *Attorney, Agent, or Firm* — Wenderoth, Lind & Ponack, L.L.P.

(57) ABSTRACT

A laser welding device is configured to switch an irradiation position of a measurement beam between a position of a keyhole coaxial with the optical axis of a laser beam and a position of a weld bead behind the center of an optical axis of the laser beam in a welding direction. The laser welding device determines whether there is a gap between an upper metal plate and a lower metal plate based on a measured value of a recess depth measured at the position of the weld bead.

7 Claims, 18 Drawing Sheets

(58) Field of Classification Search
USPC .................................................. 219/121.63
See application file for complete search history.

(56) References Cited

U.S. PATENT DOCUMENTS

| | | | | |
|---|---|---|---|---|
| 6,311,099 B1* | 10/2001 | Jasper | .................... | B23K 26/04 |
| | | | | 706/900 |
| 6,670,574 B1* | 12/2003 | Bates | .................... | B23K 26/032 |
| | | | | 219/121.64 |
| 6,791,057 B1* | 9/2004 | Kratzsch | ................. | B23K 26/24 |
| | | | | 219/121.62 |
| 7,989,730 B2* | 8/2011 | Regaard | ................. | B23K 26/04 |
| | | | | 219/121.63 |
| 8,735,768 B2* | 5/2014 | Urashima | .............. | B23K 26/26 |
| | | | | 219/121.75 |
| 8,822,875 B2* | 9/2014 | Webster | .................. | G01J 3/453 |
| | | | | 219/121.13 |
| 9,427,823 B2* | 8/2016 | Alfille | ................. | B23K 26/1437 |
| 9,517,533 B2* | 12/2016 | Uchida | .................. | G01B 11/30 |
| 9,757,817 B2* | 9/2017 | Webster | ............. | G01B 9/02091 |
| 10,578,428 B2* | 3/2020 | Strebel | .................. | G01B 11/303 |
| 2002/0079296 A1* | 6/2002 | Dijken | .................... | H05K 3/328 |
| | | | | 219/121.64 |
| 2006/0011592 A1* | 1/2006 | Wang | .................... | B23K 26/034 |
| | | | | 219/121.64 |
| 2010/0294749 A1* | 11/2010 | Kempe | ................. | G02B 21/245 |
| | | | | 219/121.75 |
| 2011/0109911 A1* | 5/2011 | Podoleanu | .............. | A61B 3/102 |
| | | | | 356/451 |
| 2012/0138586 A1* | 6/2012 | Webster | .................. | B23K 26/20 |
| | | | | 219/121.64 |
| 2012/0160815 A1* | 6/2012 | Hayashimoto | ......... | B23K 26/32 |
| | | | | 219/121.64 |
| 2012/0211474 A1* | 8/2012 | Hayashimoto | ..... | B23K 26/0665 |
| | | | | 219/121.64 |
| 2012/0285936 A1* | 11/2012 | Urashima | .......... | G01B 9/02091 |
| | | | | 219/121.63 |
| 2013/0043225 A1* | 2/2013 | Schurmann | .......... | B23K 26/044 |
| | | | | 219/121.64 |
| 2013/0068738 A1* | 3/2013 | Schurmann | ............ | B23K 26/03 |
| | | | | 219/121.72 |
| 2013/0319980 A1* | 12/2013 | Hesse | .................. | B23K 26/032 |
| | | | | 219/121.62 |
| 2014/0175071 A1* | 6/2014 | Pfitzner | ................ | B23K 26/244 |
| | | | | 348/90 |
| 2015/0014889 A1* | 1/2015 | Goya | ................. | B23K 26/0652 |
| | | | | 219/121.72 |
| 2015/0352666 A1 | 12/2015 | Fujita et al. | | |
| 2016/0039045 A1* | 2/2016 | Webster | ................. | B23K 26/14 |
| | | | | 356/450 |
| 2016/0059350 A1* | 3/2016 | Schoenleber | .......... | B23K 26/04 |
| | | | | 219/121.81 |
| 2016/0067820 A1* | 3/2016 | Mironets | ............... | B29C 64/153 |
| | | | | 219/76.12 |
| 2016/0074961 A1* | 3/2016 | Schindhelm | ......... | B23K 26/032 |
| | | | | 219/121.85 |
| 2016/0114434 A1* | 4/2016 | Regaard | ............... | B23K 26/046 |
| | | | | 219/121.81 |
| 2016/0202045 A1* | 7/2016 | Schönleber | ............ | B23K 26/03 |
| | | | | 356/497 |
| 2016/0354867 A1* | 12/2016 | Matsuoka | ............. | B23K 26/24 |
| 2016/0356595 A1* | 12/2016 | Lessmueller | ........ | B23K 26/044 |
| 2017/0001261 A1* | 1/2017 | Fujiwara | ............... | B23K 26/082 |
| 2017/0120337 A1* | 5/2017 | Kanko | ................... | B33Y 10/00 |
| 2017/0259373 A1* | 9/2017 | Albert | .................. | B23K 31/125 |
| 2017/0326669 A1* | 11/2017 | Moser | ................ | B23K 15/0013 |
| 2018/0221989 A1* | 8/2018 | Matsuoka | .......... | B23K 26/0876 |
| 2018/0372483 A1* | 12/2018 | Moser | ................... | G01B 11/22 |
| 2019/0041196 A1* | 2/2019 | Strebel | .................. | B23K 26/36 |
| 2019/0126389 A1* | 5/2019 | Fukae | ................. | B23K 26/0604 |
| 2019/0375051 A1* | 12/2019 | Regaard | ................. | B23K 26/38 |
| 2020/0198049 A1* | 6/2020 | Yokoyama | .......... | B23K 31/003 |
| 2020/0262004 A1* | 8/2020 | Moser | .................. | B01D 1/0017 |
| 2020/0361038 A1* | 11/2020 | Takechi | ................ | B23K 26/21 |

FOREIGN PATENT DOCUMENTS

| | | | | |
|---|---|---|---|---|
| EP | 2 972 479 | † | 9/2020 | |
| JP | 2003-053567 | | 2/2003 | |
| JP | 2012-236196 | | 12/2012 | |
| JP | 2015-182096 | | 10/2015 | |
| JP | 2016-538134 | | 12/2016 | |
| WO | WO-2006098646 A1 | * | 9/2006 | ............ A47J 27/026 |
| WO | 2014/132503 | | 9/2014 | |

OTHER PUBLICATIONS

International Search Report issued Jun. 18, 2019 in International (PCT) Application No. PCT/JP2019/011483 with English translation.

Extended European Search Report issued May 14, 2021 in corresponding European Patent Application No. 19785735.2.

* cited by examiner
† cited by third party

WELDING DIRECTION →

WELDING DIRECTION →

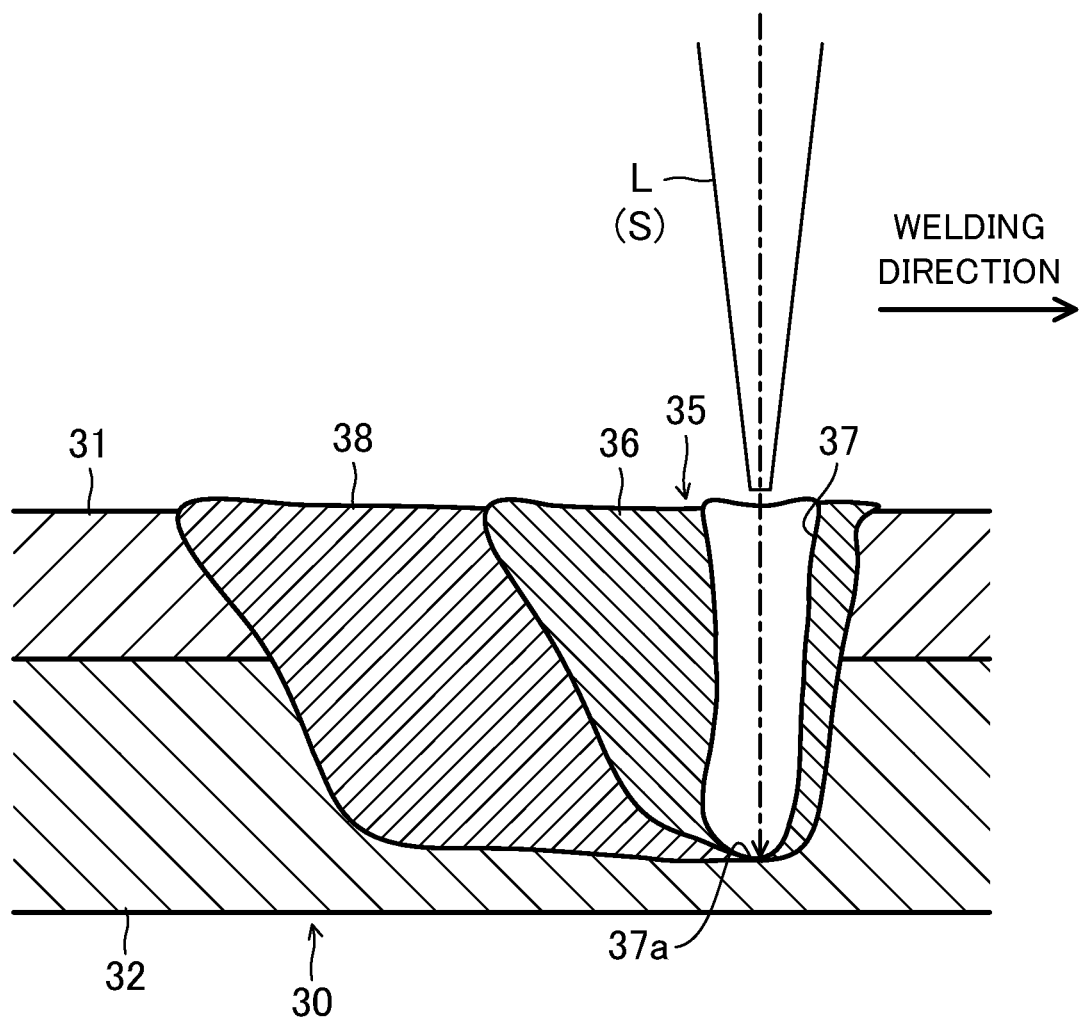

WELDING DIRECTION →

WELDING DIRECTION →

WELDING DIRECTION →

WELDING DIRECTION →

LASER WELDING DEVICE

CROSS-REFERENCE TO RELATED APPLICATIONS

This is a continuation of International Application No. PCT/JP2019/011483 filed on Mar. 19, 2019, which claims priority to Japanese Patent Application No. 2018-077702 filed on Apr. 13, 2018. The entire disclosures of these applications are incorporated by reference herein.

BACKGROUND

The present invention relates to a laser welding device.

Laser welding devices are known that evaluate the quality of weld portions by directly measuring the depth of penetration of the weld portions (see Japanese Unexamined Patent Publication No. 2012-236196, for example).

The laser welding device disclosed in Japanese Unexamined Patent Publication No. 2012-236196 is configured to coaxially align a laser beam with a measurement beam and emit the coaxially aligned beams into a keyhole of a weld portion. The measurement beam is reflected from the bottom of the keyhole and received by an optical interferometer via a beam splitter. Since the optical interferometer can measure the optical path length of the measurement beam, the depth of the keyhole is detected from the measured optical path length and determined to be the depth of penetration of the weld portion.

SUMMARY

When, for example, the laser welding device performs laser welding on overlapping workpieces, the laser welding device may fail to correctly measure the depth of penetration of the weld portion in some cases.

Specifically, when there is a gap between the overlapping workpieces, the optical path length of the measurement beam is increased by an amount of the gap. Thus, the laser welding device measures a larger value than the actual depth of penetration of the weld portion, thereby failing to have a correct measured value.

The present invention has been made in view of the foregoing, and it is an object of the present invention to measure the depth of a keyhole position and to determine the state of overlapping workpieces.

Aspects of the present disclosure are directed to a laser welding device configured to weld two overlapping workpieces by emitting a laser beam thereto. To solve the problems described above, the laser welding device is configured as follows.

That is, in a first aspect of the present disclosure, the laser welding device includes: an irradiation unit configured to emit, to the workpieces, the laser beam and a measurement beam having a wavelength different from a wavelength of the laser beam; a measurement unit configured to measure a depth from a predetermined reference surface based on the measurement beam emitted by the irradiation unit and reflected from the workpieces; and an irradiation position switching part configured to switch an irradiation position of the measurement beam between a keyhole position coaxial with an optical axis of the laser beam and a weld bead position behind a center of the optical axis of the laser beam in a welding direction.

In the first aspect, the irradiation position of the measurement beam can be switched between the keyhole position coaxial with the optical axis of the laser beam and the weld bead position behind the center of the optical axis of the laser beam in the welding direction.

The laser welding device measures the depth of the keyhole position and determines the state of the workpieces at the weld bead position by using the measurement beam.

The state of the workpieces indicates, for example, whether there is a gap between the overlapping workpieces.

A second aspect of the present disclosure is an embodiment of the first aspect. In the second aspect, the laser welding device further includes a determination unit configured to determine an amount of a gap between the two workpieces based on a measured value of a recess depth measured at the weld bead position.

In the second aspect, the amount of the gap is determined based on the measured value of the recess depth measured at the weld bead position. If, for example, the recess depth of the weld bead position is deeper than the recess depth previously measured in a state in which there is no gap between the workpieces, the amount of the gap can be calculated in proportion to the depth.

A third aspect of the present disclosure is an embodiment of the second aspect. In the third aspect, the laser welding device further includes a correction unit configured to correct, based on the amount of the gap, the measured value measured at the keyhole position.

In the third aspect, the measured value of the depth of the keyhole position is corrected based on the amount of the gap. If a large value is measured at the keyhole position due to a gap, the laser output is, for example, determined to be excessive despite the fact that the large value is due to the gap, and then the laser output is reduced. In this case, the depth of penetration may become insufficient. However, the configuration of the third aspect can prevent such an insufficient depth of penetration.

A fourth aspect of the present disclosure is an embodiment of the second or third aspect. In the fourth aspect, the laser welding device further includes a welding condition change unit configured to change a welding condition to increase molten amount of the workpieces when the amount of the gap is larger than a predetermined reference value.

In the fourth aspect, the welding condition is changed to increase the molten amount of workpieces when the amount of the gap is larger than a predetermined reference value. This configuration can reduce the occurrence of melt-through of the workpieces and can achieve a sufficient bonding strength.

Examples of the changes in welding conditions may include increasing the output of the laser beam, reducing the welding speed, and irradiating a broader area by emitting the laser beam along a spin trajectory.

A fifth aspect of the present disclosure is an embodiment of any one of the second to fourth aspects. In the fifth aspect, if the amount of the gap is larger than a predetermined upper limit, the determination unit determines that the amount of the gap is abnormal.

In the fifth aspect, the amount of the gap is determined to be abnormal when the amount of the gap is larger than a predetermined upper limit. This configuration can reduce the occurrence of melt-through of the workpieces due to a too large gap between the workpieces.

A sixth aspect of the present disclosure is directed to a laser welding device configured to weld two overlapping workpieces by emitting a laser beam thereto.

The two workpieces are offset in an in-plane direction to expose part of one of the workpieces behind the other workpiece as viewed from an irradiation direction of the laser beam.

The laser welding device includes: an irradiation unit configured to emit, to the workpieces, the laser beam and a measurement beam having a wavelength different from a wavelength of the laser beam; a measurement unit configured to measure a depth from a predetermined reference surface based on the measurement beam emitted by the irradiation unit and reflected from the workpieces; and an irradiation position switching part configured to switch an irradiation position of the measurement beam between a keyhole position coaxial with an optical axis of the laser beam and a boundary position between the two workpieces in front of a center of an optical axis of the laser beam in a welding direction.

In the sixth aspect, the overlapping workpieces are offset to expose part of one of the workpieces behind the other workpiece as viewed from the irradiation direction of the laser beam. The irradiation position of the measurement beam can be switched between the keyhole position coaxial with the optical axis of the laser beam and the boundary position between the workpieces in front of the center of the optical axis of the laser beam in the welding direction.

The laser welding device, by using the measurement beam, measures the depth of the keyhole position, and detects the boundary position between the workpieces in front of the laser beam in the welding direction.

Specifically, to perform profile control in which the laser beam is emitted along the boundary position between two workpieces, the boundary position needs to be accurately detected. If the measurement beam is emitted to a position in front of the center of the optical axis of the laser beam in the welding direction, the boundary position can be detected based on the measured values.

Correction, during laser welding, of misalignment of the irradiation unit relative to the detected boundary position allows the laser beam and the measurement beam to be emitted to a proper position, which can increase the accuracy of laser welding and precision of measurement.

A seventh aspect of the present disclosure is an embodiment of the sixth aspect. In the seventh aspect, the irradiation position switching part switches the irradiation position of the measurement beam such that the irradiation position gyrates around a center of rotation moving along a predetermined welding path, and the laser welding device includes a determination unit configured to determine an amount of a gap between the two workpieces based on a plurality of measured values measured before and after the measurement beam crosses the boundary position.

In the seventh aspect, the irradiation position of the measurement beam gyrates, and the amount of the gap is determined based on a plurality of measured values measured before and after the measurement beam crosses the boundary position between the workpieces.

Specifically, when there is no gap between the workpieces, the measured value measured at the surface of the back workpiece as viewed from the irradiation direction of the laser beam agrees with a value obtained by adding, in the depth direction, the thickness of the front workpiece to the value measured at the surface of the front workpiece as viewed from the irradiation direction of the laser beam.

If the value measured at the surface of the back workpiece as viewed from the irradiation direction of the laser beam is larger (deeper) than the value obtained by adding, in the depth direction, the thickness of the front workpiece to the value measured at the surface of the front workpiece, the difference between these values can be determined to be the amount of the gap.

An eighth aspect of the present disclosure is an embodiment of the seventh aspect. In the eighth aspect, the laser welding device further includes a correction unit configured to correct, based on the amount of the gap, the measured value measured at the keyhole position.

In the eighth aspect, the measured value of the depth of the keyhole position is corrected based on the amount of the gap. If a large value is measured at the keyhole position due to a gap, the laser output is, for example, determined to be excessive despite the fact that the large value is due to the gap, and then the laser output is reduced. In this case, the depth of penetration may become insufficient. However, the configuration of the eighth aspect can prevent such an insufficient depth of penetration.

A ninth aspect of the present disclosure is an embodiment of the seventh or eighth aspect. In the ninth aspect, if the amount of the gap is larger than a predetermined upper limit, the determination unit determines that the amount of the gap is abnormal.

In the ninth aspect, the amount of the gap is determined to be abnormal when the amount of the gap is larger than a predetermined upper limit. This configuration can reduce the occurrence of melt-through of the workpieces due to a too large gap between the workpieces.

According to the aspects of the present disclosure, the depth of the keyhole position can be measured and the state of overlapping workpieces can be determined.

BRIEF DESCRIPTION OF THE DRAWINGS

FIG. 5 is a side cross-sectional view illustrating the positional relation among the laser beam, the measurement beam, and a keyhole.

DETAILED DESCRIPTION

Embodiments of the present invention will be described in detail with reference to the drawings. Note that the following description of embodiments is merely an example in nature, and is not intended to limit the scope, applications, or use of the present invention.

First Embodiment

Figure 1:
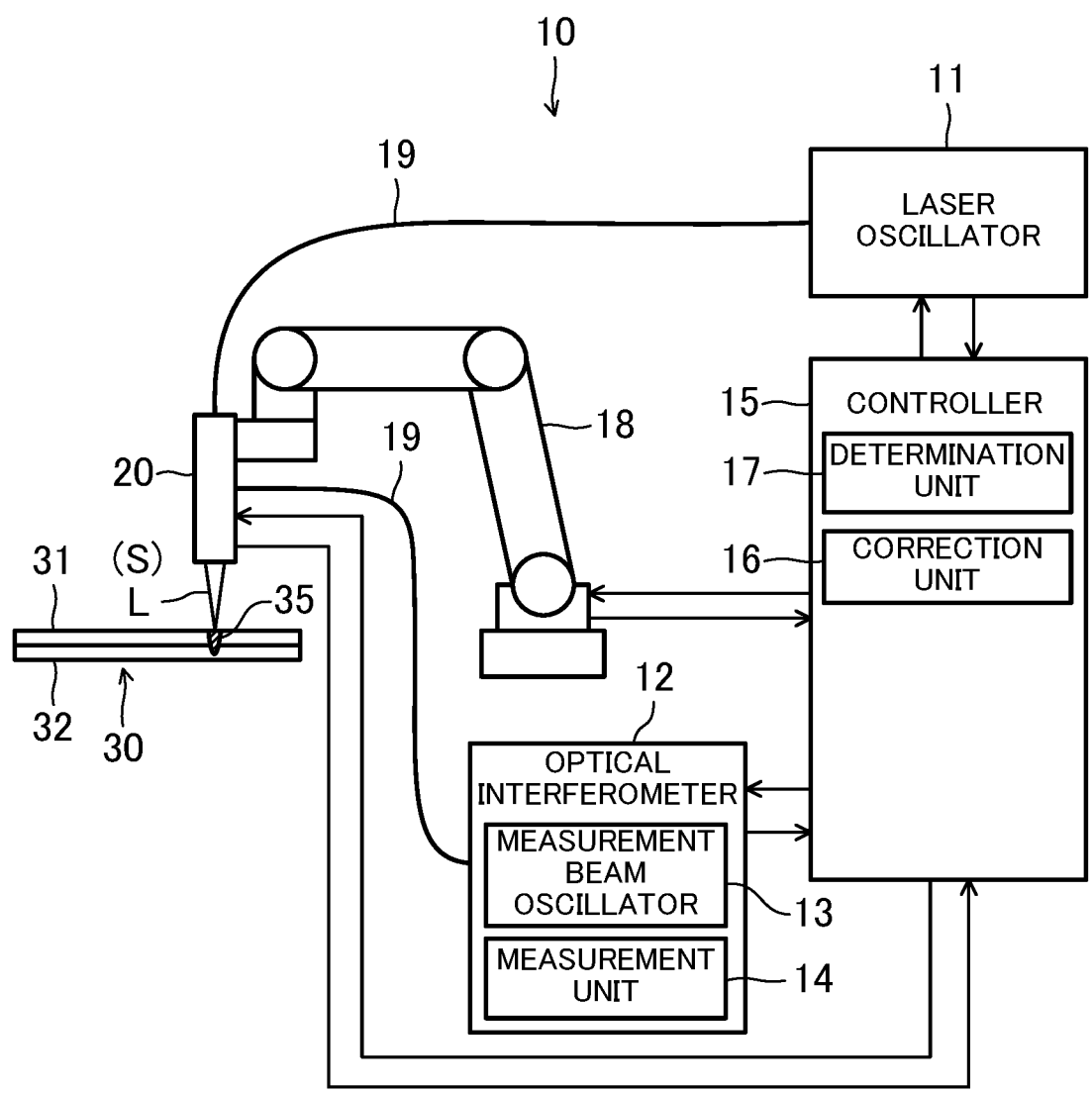
FIG. 1 is a schematic view of a laser welding device according to a first embodiment.

As illustrated in FIG. 1, a laser welding device 10 includes a laser oscillator 11 configured to output a laser beam L, an optical interferometer 12 configured to output a measurement beam S, a laser emitting head 20 (irradiation unit) configured to emit the laser beam L and the measurement beam S to a welding target 30, a robot 18 to which the laser emitting head 20 is attached and which is configured to carry the laser emitting head 20, and a controller 15 configured to control the operations of the laser emitting head 20 and the robot 18 to perform laser welding.

The laser oscillator 11 outputs the laser beam L based on an instruction from the controller 15. The laser oscillator 11 and the laser emitting head 20 are connected via an optical fiber 19. The laser beam L is transmitted from the laser oscillator 11 to the laser emitting head 20 through the optical fiber 19.

The optical interferometer 12 includes a measurement beam oscillator 13 configured to output the measurement beam S having a wavelength different from the wavelength of the laser beam L and a measurement unit 14 configured to measure the depth of penetration of a weld portion 35 to be described later. The measurement beam oscillator 13 outputs the measurement beam S based on an instruction from the controller 15. The optical interferometer 12 and the laser emitting head 20 are connected via an optical fiber 19. The measurement beam S is transmitted from the optical interferometer 12 to the laser emitting head 20 through the optical fiber 19.

The laser emitting head 20 is attached to a distal end of an arm of the robot 18. The laser emitting head 20 focuses the laser beam L and the measurement beam S on the welding target 30 based on an instruction from the controller 15.

The robot 18 moves the laser emitting head 20 based on an instruction from the controller 15 to a position as instructed, at which the laser beam L and the measurement beam S are emitted for scanning.

The controller 15 is connected to the laser oscillator 11, the optical interferometer 12, and the robot 18. The controller 15 has a function of controlling the travel speed of the laser emitting head 20 and has functions of controlling when to start or stop the output of the laser beam L and controlling an output intensity of the laser beam L. In other words, the controller 15 configures a welding condition change unit that can change welding conditions.

Although details will be described later, the controller 15 includes a determination unit 17 configured to determine the depth of penetration of the weld portion 35 and a correction unit 16 configured to correct a measured value of the position of a keyhole 37, based on a plurality of measured values measured by the measurement unit 14.

The welding target 30 includes an upper metal plate 31 and a lower metal plate 32 that are workpieces overlapping in the vertical direction. The laser welding device 10 welds the upper metal plate 31 and the lower metal plate 32 by emitting the laser beam L to the upper surface of the upper metal plate 31.

The laser welding device 10 according to the first embodiment can measure the depth of penetration of the weld portion 35 while performing laser welding.

Figure 2:
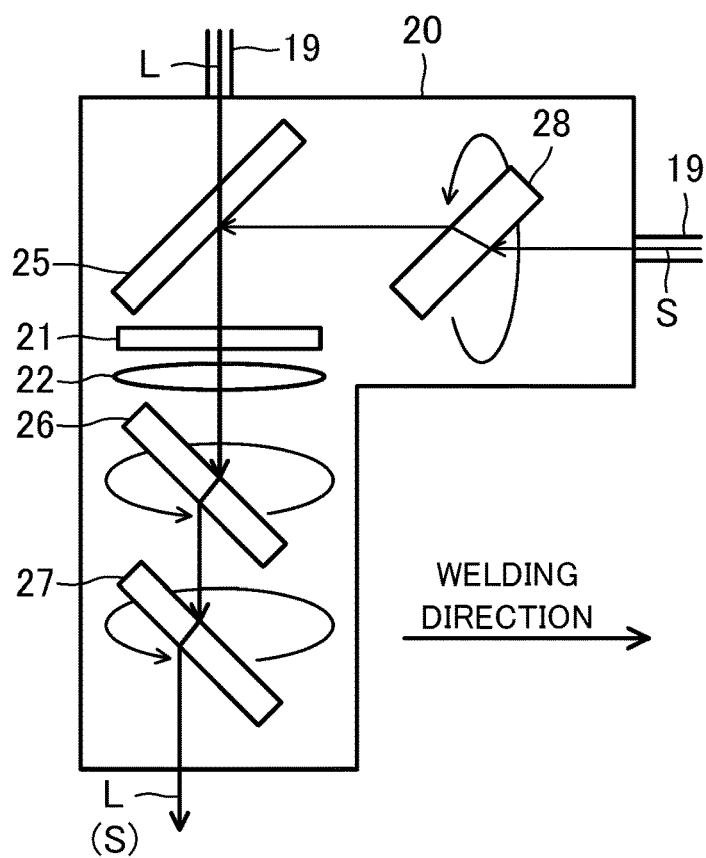
FIG. 2 is a schematic view illustrating a configuration of a laser emitting head in emitting a measurement beam to a keyhole position.

Specifically, as illustrated in FIG. 2, the laser emitting head 20 includes a beam splitter 25 configured to adjust the laser beam L and the measurement beam S to travel in parallel with each other, a collimating lens 21 and a focus lens 22 transmitting the laser beam L and the measurement beam S, a first parallel plate 26, a second parallel plate 27, and a third parallel plate 28 (irradiation position switching part).

The beam splitter 25 is a dichroic mirror configured to transmit or reflect a beam having a predetermined wavelength and is configured to transmit the laser beam L from the laser oscillator 11 and reflect the measurement beam S from the optical interferometer 12.

In one preferred embodiment, the difference between the wavelength of the laser beam L and the wavelength of the measurement beam S is 100 nm or more to sufficiently separate the laser beam L from the measurement beam S with the beam splitter 25. In this embodiment, the spot diameter of the laser beam L is set to 700 μm to 800 μm, and the spot diameter of the measurement beam S is set to 100 μm.

The first parallel plate 26, the second parallel plate 27, and the third parallel plate 28 are connected with a motor (not illustrated) and are rotated in accordance with an instruction from the controller 15.

The laser beam L output from the laser oscillator 11 passes through the optical fiber 19 to the laser emitting head 20. The laser beam L enters the laser emitting head 20 and passes through the beam splitter 25.

The measurement beam S output from the optical interferometer 12 passes through the optical fiber 19 to the laser emitting head 20. The measurement beam S enters the laser emitting head 20 and passes through the third parallel plate 28, at which the position of the measurement beam S incident on the beam splitter 25 is changed.

Specifically, when the third parallel plate 28 is rotated and adjusted to an angular position as illustrated in FIG. 2, the measurement beam S is directed to a position at which the measurement beam S is coupled with the laser beam L transmitted through the beam splitter 25.

The measurement beam S is concentrically and coaxially aligned with the laser beam L by the beam splitter 25. The coaxially aligned laser beam L and measurement beam S are collimated by the collimating lens 21 and focused by the focus lens 22.

Figure 3:
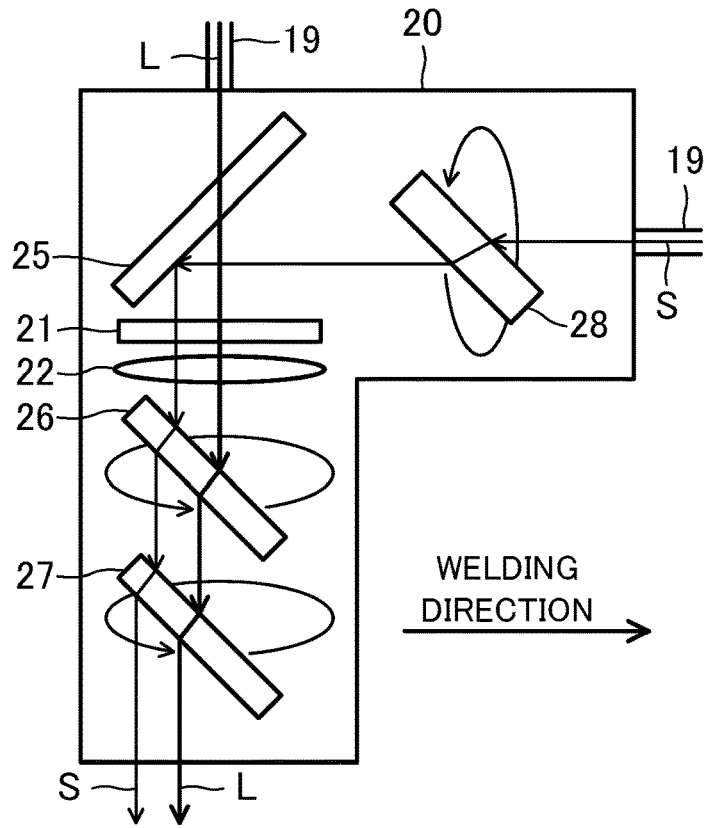
FIG. 3 is a schematic view illustrating a configuration of the laser emitting head in emitting the measurement beam to a weld bead position.

When the third parallel plate 28 is rotated and adjusted to an angular position as illustrated in FIG. 3, the measurement beam S is directed to a position behind the position, in the welding direction, of the laser beam L transmitted through the beam splitter 25.

Specifically, in the example illustrated in FIG. 3, the laser emitting head 20 performs welding while moving rightward, and the measurement beam S is refracted by the beam splitter 25 at a position behind (at the left side of) the position of the laser beam L in the welding direction. The measurement beam S then travels in parallel with the laser beam L. The laser beam L and the measurement beam S are collimated by the collimating lens 21 and focused by the focus lens 22.

Figure 4:
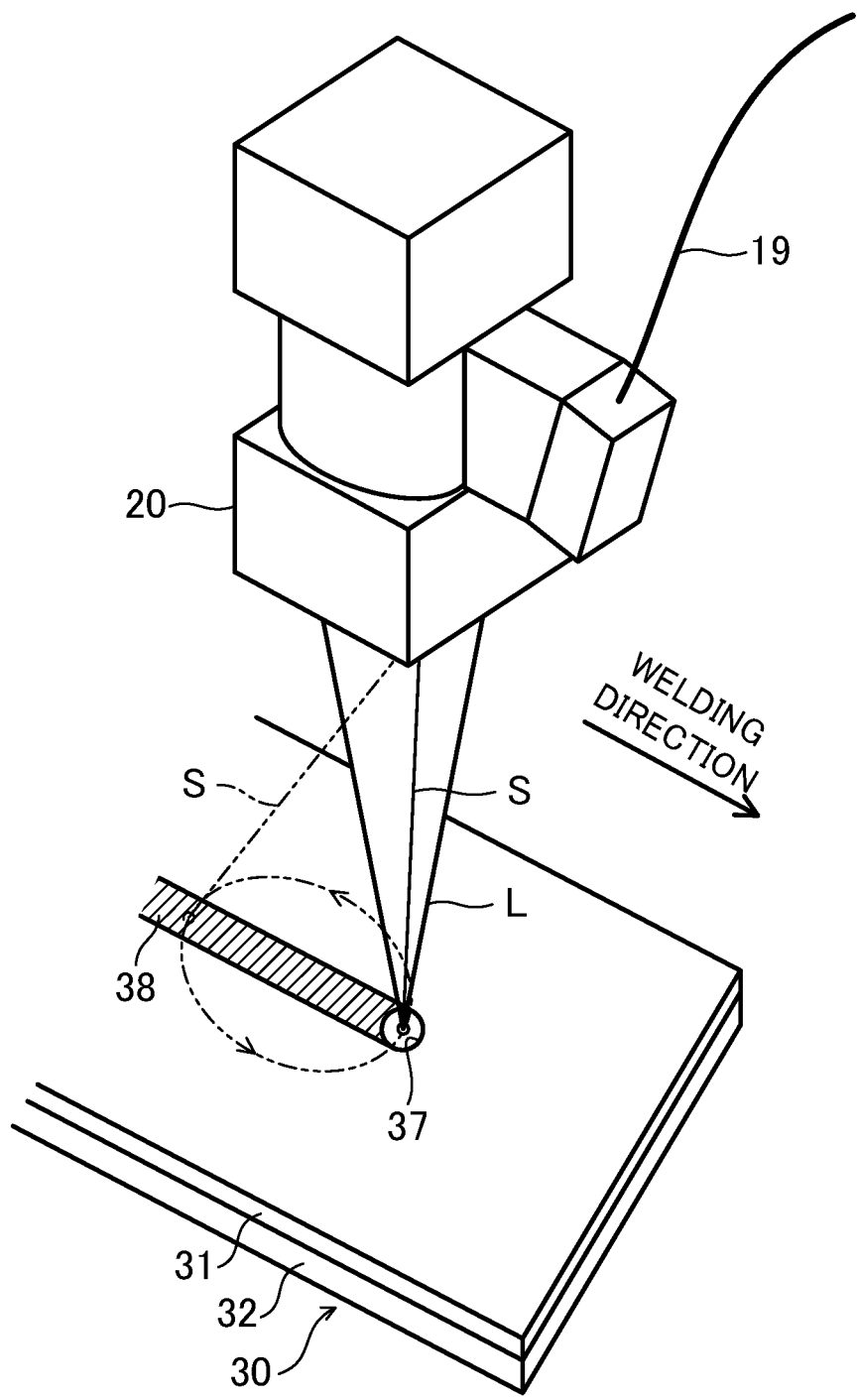
FIG. 4 is a perspective view illustrating an irradiation position of a laser beam and a measurement beam.

In this embodiment, the third parallel plate 28 is disposed closer to the beam entrance of the measurement beam S than the beam splitter 25. Rotating the third parallel plate 28 rotates the measurement beam S along a circular trajectory, whereby the measurement beam S can gyrate (see FIG. 4).

With this configuration, the irradiation position of the measurement beam S can be switched between a keyhole position coaxial with the optical axis of the laser beam L and a weld bead position behind the center of the optical axis of the laser beam L in the welding direction.

The laser beam L and the measurement beam S focused by the focus lens 22 pass through the first parallel plate 26 and the second parallel plate 27 controlled by the controller 15, at which the irradiation position (focal length) of the laser beam L and the measurement beam S is determined, and the laser beam L and the measurement beam S are emitted to the weld portion 35 of the welding target 30.

In this case, in the laser emitting head 20, the first parallel plate 26 and the second parallel plate 27 are rotated to rotate the laser beam L and the measurement beam S along circular trajectories, whereby the laser beam L and the measurement beam S can gyrate.

Since the robot 18 moves the laser emitting head 20, the irradiation position of the laser beam L and the measurement beam S can be moved in a welding region on the welding target 30.

As illustrated in FIG. 5, in welding the weld portion 35 of the welding target 30 including the upper metal plate 31 and the lower metal plate 32, the laser welding device 10 emits the laser beam L to the upper surface of the upper metal plate 31 from above the welding target 30.

The weld portion 35 irradiated with the laser beam L is melted from an upper portion, and a weld puddle 36 is formed in the weld portion 35. When the weld portion 35 is melted, molten metal in the weld puddle 36 vaporizes and the vaporizing metal generates vapor pressure to form a keyhole 37. In this example, the weld portion 35 includes both weld puddle 36 and keyhole 37. A weld bead 38 is formed behind the weld puddle 36 in the welding direction when the weld puddle 36 is solidified.

To simultaneously perform laser welding and measurement of the depth of penetration, the laser welding device 10 adjusts the third parallel plate 28 to the angular position illustrated in FIG. 2.

The measurement beam S output from the optical interferometer 12 passes through the third parallel plate 28 to the beam splitter 25, at which the measurement beam S is concentrically and coaxially aligned with the laser beam L output from the laser oscillator 11, and then emitted into the keyhole 37. The emitted measurement beam S is reflected from a bottom 37a of the keyhole 37 and enters the optical interferometer 12 via the beam splitter 25.

The optical path length of the measurement beam S entering the optical interferometer 12 is measured by the measurement unit 14. The measurement unit 14 determines the depth of the keyhole 37 from a surface of the welding target 30 or from an imaginary reference plane based on the measured optical path length. The depth of the keyhole 37 is determined to be the depth of penetration of the weld portion 35. The laser welding device 10 determines the quality of the weld portion 35 based on the determined depth of penetration.

Figure 6A:
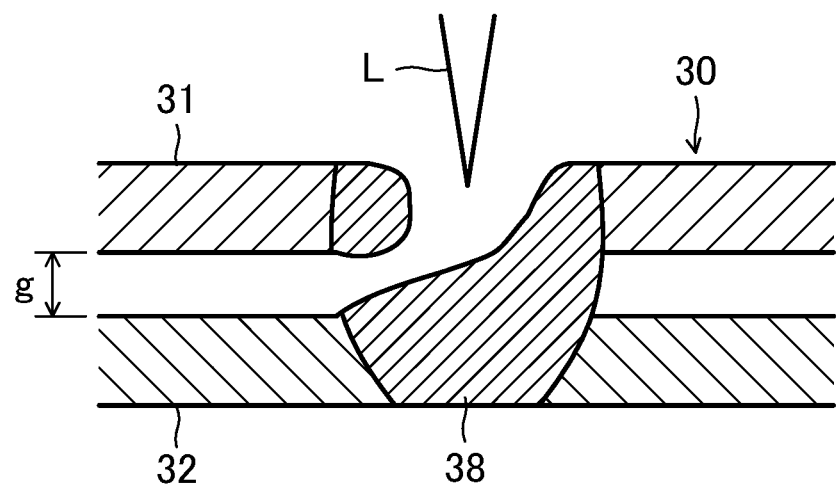
FIG. 6A is a diagram illustrating a melt-through of an upper metal plate due to a gap.

When, for example, there is a gap g between the upper metal plate 31 and the lower metal plate 32 as illustrated in FIG. 6A and an amount of the gap is larger than a predetermined reference value, the upper metal plate 31 melted by the laser beam L may flow into the gap and melt-through may occur.

Figure 6B:
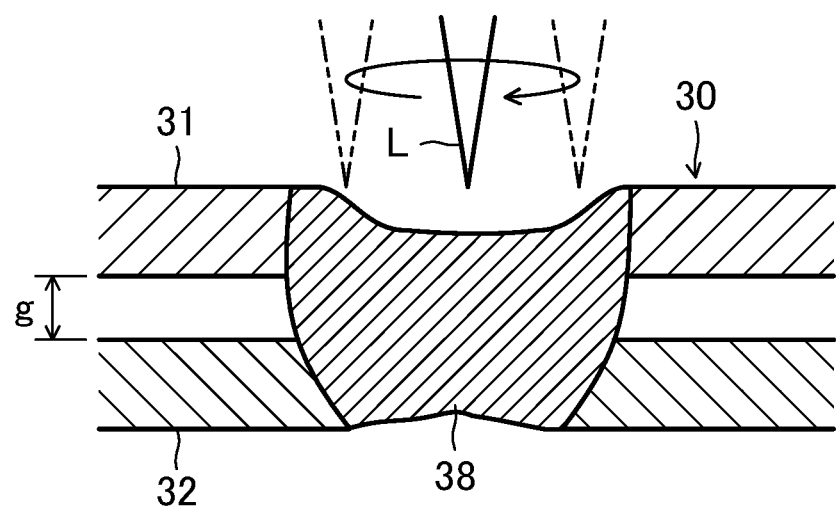
FIG. 6B is a diagram illustrating a state in which the melt-through is prevented by emitting the laser beam along a spin trajectory.

To prevent such melt-through of the upper metal plate 31, the welding conditions are changed to increase molten amount of the upper metal plate 31. Specifically, as illustrated in FIG. 6B, the first parallel plate 26 and the second parallel plate 27 are rotated so that the laser beam L is emitted to the welding target 30 along a spin trajectory in which the beam spot is relatively moved in the welding direction while the laser beam L is emitted in a spiral manner. The welding target 30 is welded in this manner.

The spin trajectory is a path of the laser beam L in which the spot of the laser beam L being emitted is moved in the welding direction while being rotated along a circular trajectory. In other words, the spin trajectory is a rotating path of the laser beam L that relatively linearly travels in the welding direction.

As described above, the molten amount of the upper metal plate 31 is increased by emitting the laser beam L along the spin trajectory and irradiating a broader area as illustrated in FIG. 6B. This configuration can reduce melt-through of the welding target 30 and achieve a sufficient bonding strength.

Other examples of the changes in welding conditions may include increasing the output of the laser beam L and reducing the welding speed.

Figure 7A:
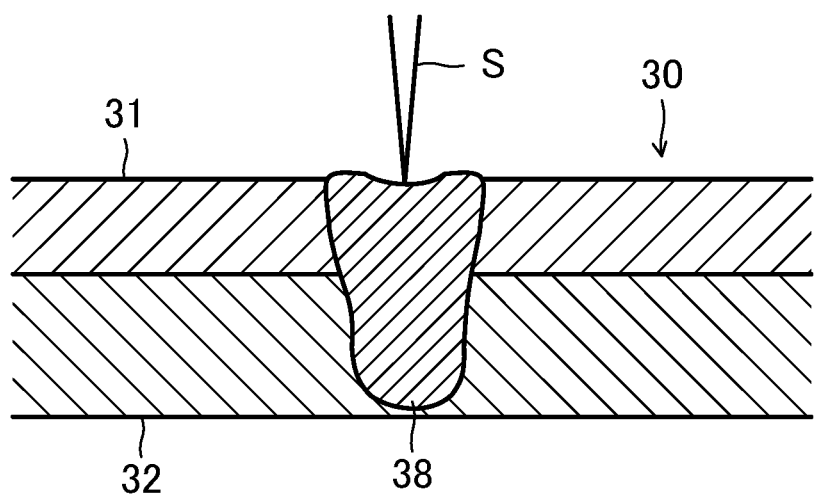
FIG. 7A is a diagram illustrating an operation of measuring a recess depth of a weld bead when there is no gap between workpieces.

Described next is the procedure of determining whether there is a gap between the upper metal plate 31 and the lower metal plate 32. First, as illustrated in FIG. 7A, the recess depth of the weld bead 38 is measured by emitting the measurement beam S to the weld bead 38. Then, the measured value is compared with a previously measured recess depth measured in a state where there is no gap g.

In the example illustrated in FIG. 7A, the measured value substantially agrees with the previously measured depth, and thus it can be determined that there is no gap g between the upper metal plate 31 and the lower metal plate 32 based on the measured value of the recess depth of the weld bead 38.

Figure 7B:
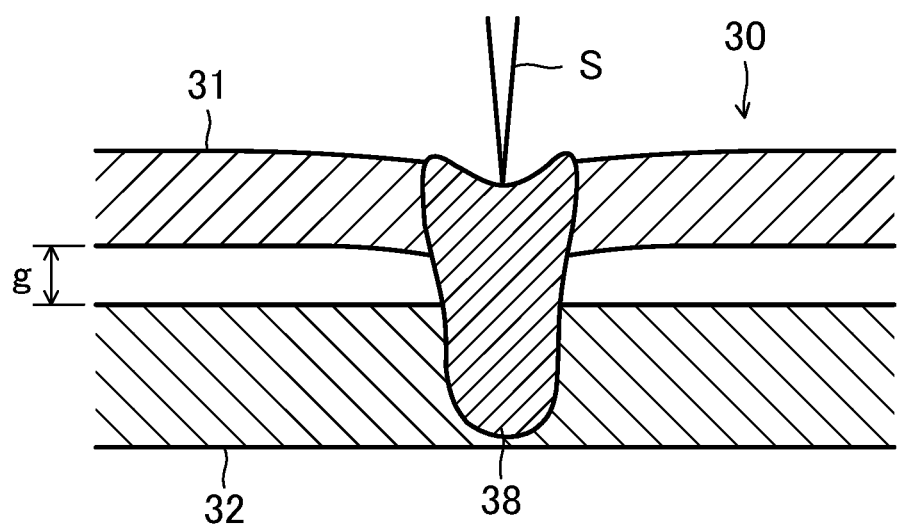
FIG. 7B is a diagram illustrating an operation of measuring a recess depth of a weld bead when there is a gap between workpieces.

In the example illustrated in FIG. 7B, there is a gap g between the upper metal plate 31 and the lower metal plate 32 and the measured value of the recess depth of the weld bead 38 is larger than the measured value measured in the case where there is no gap g therebetween.

Figure 8:
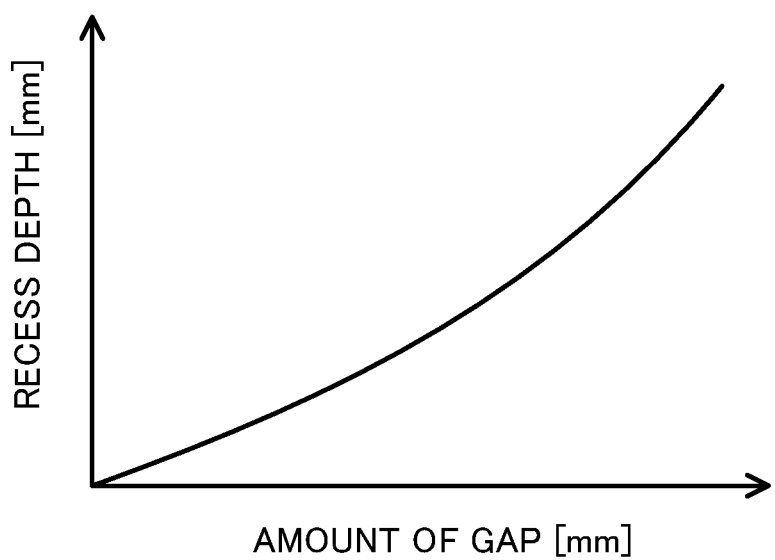
FIG. 8 is a graph illustrating a relation between an amount of gap and a recess depth.

As indicated by the graph in FIG. 8, the greater the recess depth of the weld bead 38 is, the larger the amount of the gap is. The values of the graph are previously measured in, for example, experiments and are stored in the determination unit 17 as a table. It can be determined that there is a gap g between the upper metal plate 31 and the lower metal plate 32, based on the value measured in the state in which there is a gap g and the table, and the amount of the gap can be calculated from the measured value and the table.

If a depth is measured at the position of the keyhole 37 in the case where there is a gap g between the metal plates, the measured value is larger by an amount of the gap g. This may lead to a reduced accuracy of the laser welding.

Specifically, a case will be discussed in which: the upper metal plate 31 has a thickness of 1 mm; the lower metal plate 32 has a thickness of 4.3 mm; and that a target value of the depth of the keyhole 37 is set to 4 mm.

Suppose that the laser output is adjusted to create a keyhole 37 of 4 mm deep. In this case, if there is no gap g between the upper metal plate 31 and the lower metal plate 32, the depth of the keyhole 37 measured by using the measurement beam S is 4 mm and the laser welding can be performed accurately.

On the other hand, if there is a gap g between the upper metal plate 31 and the lower metal plate 32 and the amount of the gap is, for example, 0.3 mm, the depth of the keyhole 37 measured by using the measurement beam S at the same laser output is 4.3 mm. The controller 15 then determines that the laser output is excessive and thus changes the welding conditions to reduce the laser output.

If the laser output is reduced because of the large measured value at the position of the keyhole 37 despite the fact that the large value is due to the gap g, the depth of penetration may become shallow, which may lead to a reduced bonding strength.

In this embodiment, if there is a gap g between the upper metal plate 31 and the lower metal plate 32, the correction unit 16 corrects the measured value of the depth at the position of the keyhole 37 in accordance with the amount of the gap.

Specifically, if the amount of the gap is 0.3 mm and the measured value at the position of the keyhole 37 is 4.3 mm, the correction unit 16 subtracts 0.3 mm from 4.3 mm and corrects the measured value at the position of the keyhole 37 to be 4 mm.

The controller 15 then compares the corrected measured value of the position of the keyhole 37 with a target value. In this case, the corrected measured value of the position of the keyhole 37 is 4 mm and the target value is 4 mm, as well, and thus the controller 15 performs control to continue the laser welding at the current laser output.

Suppose that, for example, the thickness of a BK7 used as the third parallel plate 28 is 30 mm, that the wavelength of the measurement beam S is 1300 nm, and that the angle of incidence of the measurement beam S on the third parallel plate 28 is 45 degrees. In this case, the diameter of the rotation of the measurement beam S output from the third parallel plate 28 is 9.9 mm. Suppose that, for example, the third parallel plate 28 is rotated at 50 Hz and the diameter of the rotation of the measurement beam S output from the third parallel plate 28 corresponds to the spin trajectory of the laser beam L emitted to the welding target 30. In this case, if the welding speed is 3 m/min, the measurement beam S travels in the welding direction at 1 mm per rotation of the third parallel plate 28, i.e., per spin of the measurement beam S. This means that a distance between spins of the spin trajectory is 1 mm and that the measurement can be performed at every 1 mm in the welding direction, thereby enabling precise measurement and correction of the measured value by using the measurement beam S. The measurement resolution varies in accordance with the rotation rate of the third parallel plate 28, and more precise measurement can be possible. The BK7 is an optical glass having a certain refractive index.

Figure 9:
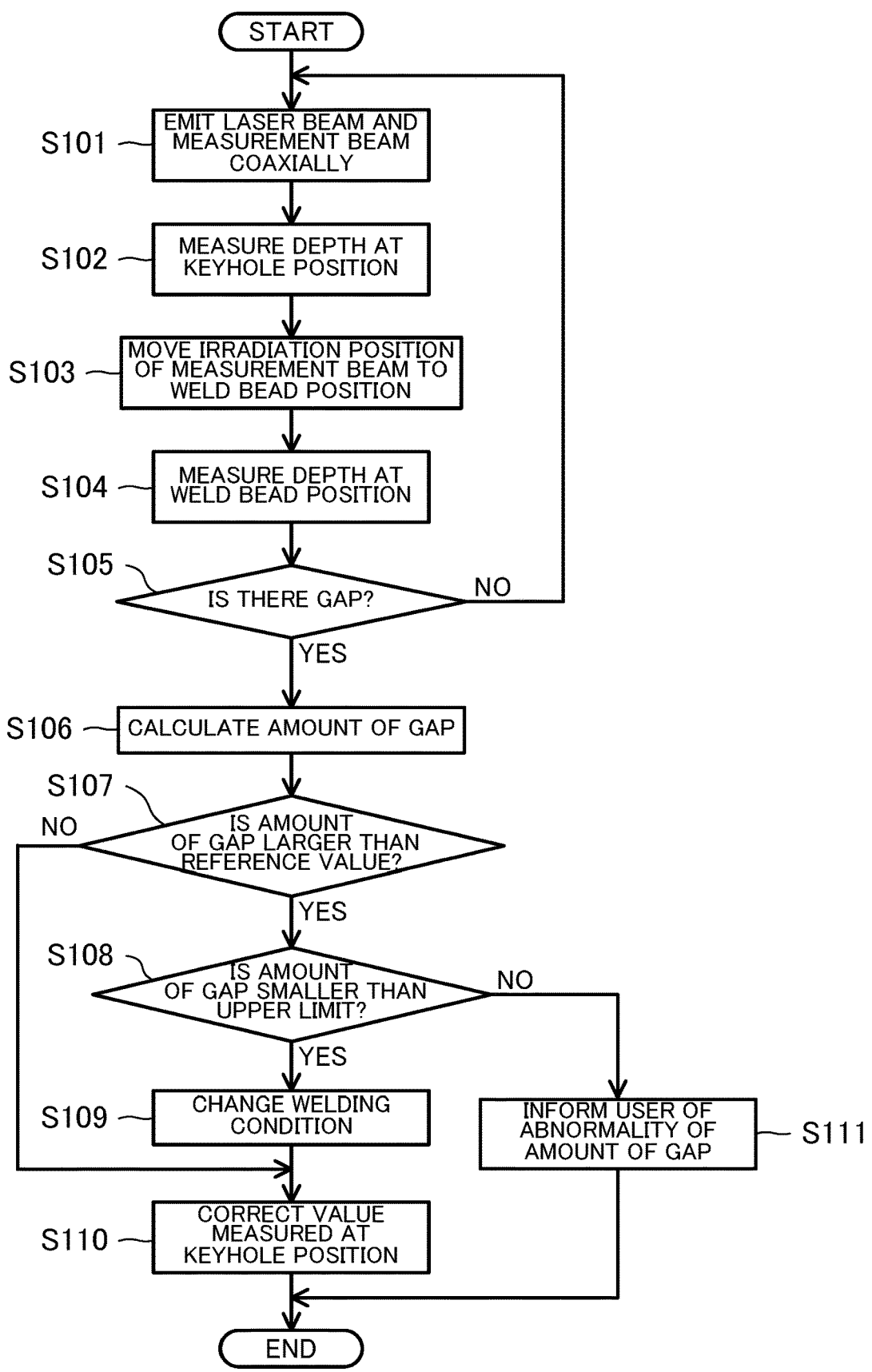
FIG. 9 is a flowchart illustrating the procedure of switching the irradiation position of the measurement beam between a keyhole position and a weld bead position.

The following describes the procedure of switching the irradiation position of the measurement beam S between the position of the keyhole 37 and the position of the weld bead 38 with reference to the flowchart illustrated in FIG. 9.

As illustrated in FIG. 9, at Step S101, the laser beam L and the measurement beam S are coaxially aligned with each other in the laser emitting head 20, and the laser emitting head 20 emits the coaxially aligned beams to the weld portion 35. The process proceeds to Step S102.

At Step S102, the measurement unit 14 measures the depth of the position of the keyhole 37 based on the measurement beam S reflected from the bottom of the keyhole 37, and the process proceeds to Step S103.

At Step S103, the irradiation position of the measurement beam S gyrates and is moved to a position of the weld bead 38 behind the center of the optical axis of the laser beam L in the welding direction, and the process proceeds to Step S104.

At Step S104, the measurement unit 14 measures the recess depth at the position of the weld bead 38 based on the measurement beam S reflected from the bottom of the weld bead 38, and the process proceeds to Step S105.

At Step S105, the determination unit 17 determines whether there is a gap g between the upper metal plate 31 and the lower metal plate 32 based on the measured value of the recess depth of the weld bead 38. If it is YES at Step S105, the process proceeds to Step S106. If it is NO at Step S105, the process returns to Step S101.

At Step S106, the amount of the gap is calculated based on the measured value of the recess depth of the weld bead 38, and the process proceeds to Step S107.

At Step S107, the determination unit 17 determines whether the amount of the gap is larger than a predetermined reference value. If it is YES at Step S107, the process proceeds to Step S108. If it is NO at Step S107, the process proceeds to Step S110.

The predetermined reference value is an amount of gap with which melt-through occurs. Reference values are obtained in, for example, previously performed experiments and stored in the determination unit 17 as a table.

At Step S108, the determination unit 17 determines whether the amount of the gap is smaller than a predetermined upper limit. If it is YES at Step S108, the process proceeds to Step S109. If it is NO at Step S108, the determination unit 17 determines that the amount of the gap is abnormal and the process proceeds to Step S111.

The predetermined upper limit is an amount of gap with which melt-through is inevitable even if the molten amount of the upper metal plate 31 is increased. Upper limits are obtained in, for example, previously performed experiments and stored in the determination unit 17 as a table. If, for example, the thickness of the upper metal plate 31 is 1 mm, the upper limit is about 0.5 mm.

At Step S109, welding conditions are changed to increase the molten amount of the upper metal plate 31 by, for example, emitting the laser beam L along the spin trajectory and irradiating a broader area. The process proceeds to Step S110.

At Step S110, the measured value of the depth at the position of the keyhole 37 is corrected in accordance with the amount of the gap, and the process is ended.

At Step S111, for example, an alert message indicating abnormality of the measured value is displayed on a display monitor (not illustrated) to inform a user of the abnormality, and the process is ended.

Second Embodiment

Figure 10:
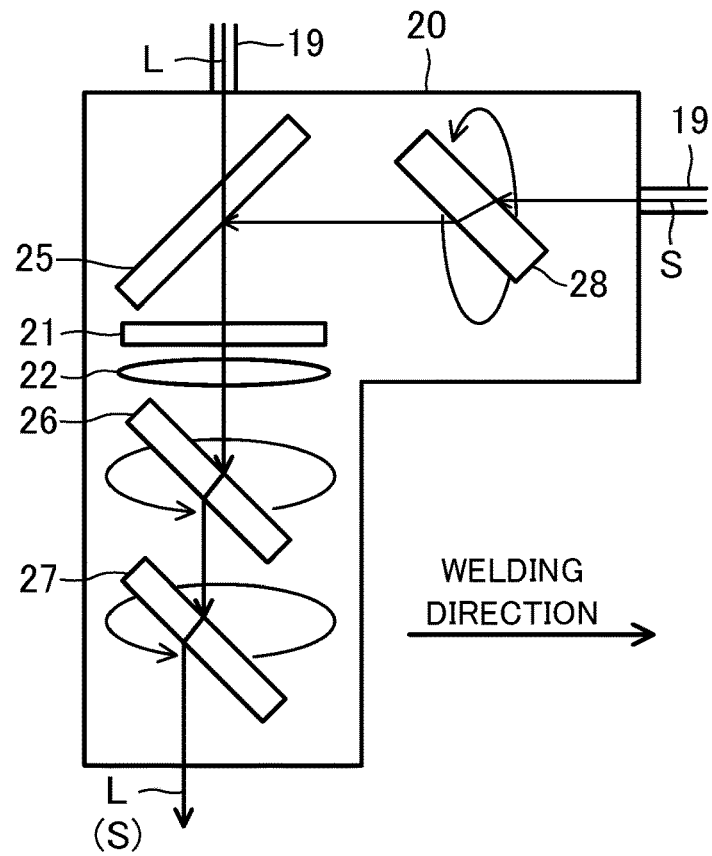
FIG. 10 is a schematic view illustrating a configuration of a laser emitting head of a laser welding device according to a second embodiment in emitting a measurement beam to a keyhole position.

FIG. 10 is a schematic view illustrating a configuration of a laser emitting head of a laser welding device according to a second embodiment in emitting a measurement beam to a keyhole position. In the following description, components that are the same as those of the first embodiment are given the same reference characters and only the differences will be described.

As illustrated in FIG. 10, the laser emitting head 20 includes a beam splitter 25 configured to adjust the laser beam L and the measurement beam S to travel in parallel with each other, a collimating lens 21 and a focus lens 22 transmitting the laser beam L and the measurement beam S, a first parallel plate 26, a second parallel plate 27, and a third parallel plate 28 (irradiation position switching part).

The laser beam L output from the laser oscillator 11 passes through the optical fiber 19 to the laser emitting head 20. The laser beam L enters the laser emitting head 20 and passes through the beam splitter 25.

The measurement beam S output from the optical interferometer 12 passes through the optical fiber 19 to the laser emitting head 20. The measurement beam S enters the laser emitting head 20 and passes through the third parallel plate 28, at which the position of the measurement beam S incident on the beam splitter 25 is changed.

Specifically, when the third parallel plate 28 is rotated and adjusted to an angular position as illustrated in FIG. 10, the measurement beam S is directed to a position at which the measurement beam S is coupled with the laser beam L transmitted through the beam splitter 25.

The measurement beam S is concentrically and coaxially aligned with the laser beam L by the beam splitter 25. The coaxially aligned laser beam L and measurement beam S are collimated by the collimating lens 21 and focused by the focus lens 22.

Figure 11:
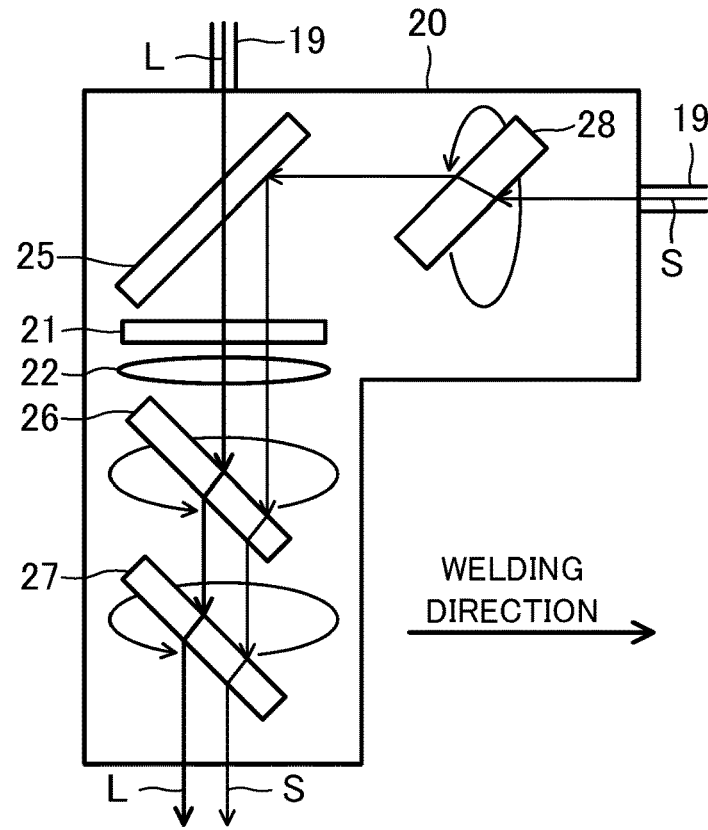
FIG. 11 is a schematic view illustrating a configuration of the laser emitting head in emitting the measurement beam to a boundary position between an upper metal plate and a lower metal plate.

When the third parallel plate 28 is rotated and adjusted to an angular position as illustrated in FIG. 11, the measurement beam S is directed to a position in front of the position, in the welding direction, of the laser beam L transmitted through the beam splitter 25.

Specifically, in the example illustrated in FIG. 11, the laser emitting head 20 performs welding while moving rightward, and the measurement beam S is refracted by the beam splitter 25 at a position in front of (at the right side of) the position of the laser beam L in the welding direction. The measurement beam S then travels in parallel with the laser beam L. The laser beam L and the measurement beam S are collimated by the collimating lens 21 and focused by the focus lens 22.

In this embodiment, the third parallel plate 28 is disposed closer to the beam entrance of the measurement beam S than the beam splitter 25. Rotating the third parallel plate 28 rotates the measurement beam S along a circular trajectory, whereby the measurement beam S can gyrate (see FIG. 12).

With this configuration, the irradiation position of the measurement beam S can be switched between a keyhole position coaxial with the optical axis of the laser beam L and a position in front of the center of the optical axis of the laser beam L in the welding direction.

Figure 12:
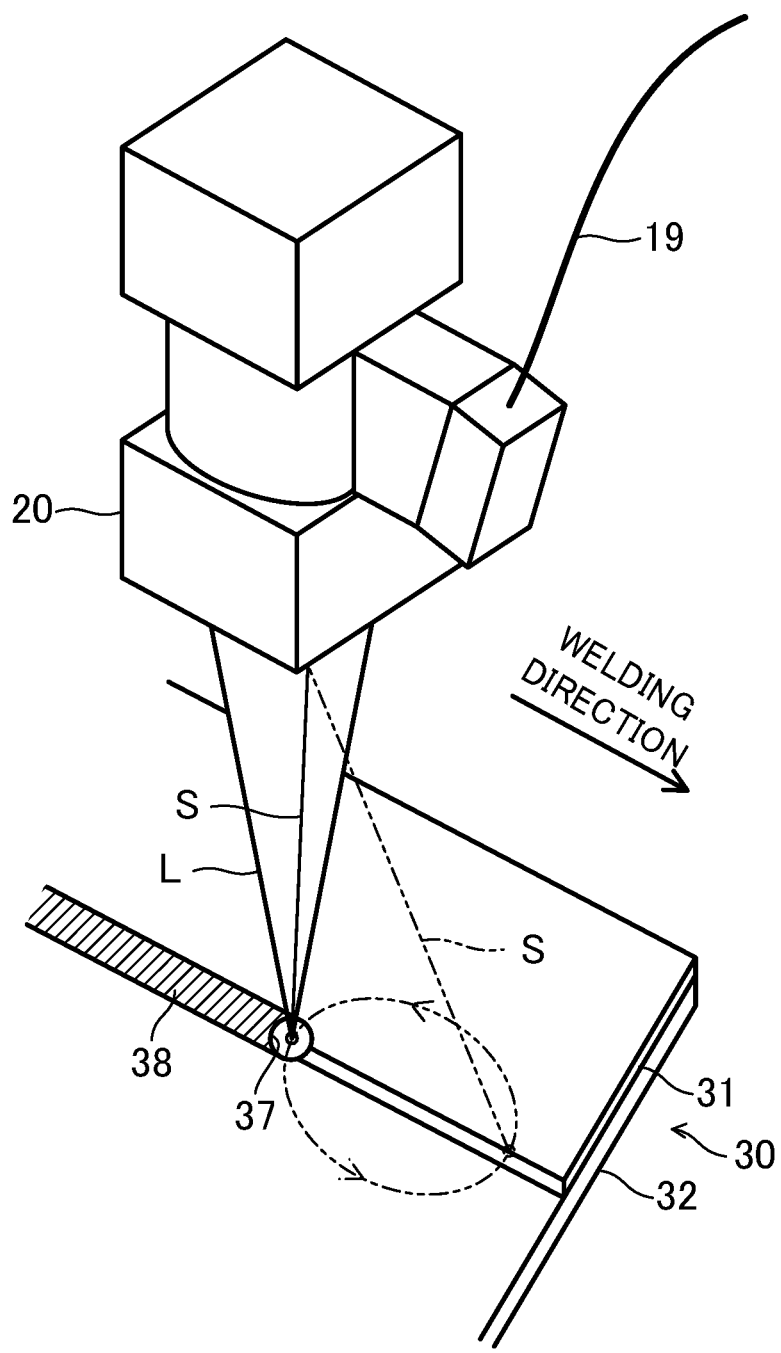
FIG. 12 is a perspective view for illustrating an irradiation position of a laser beam and a measurement beam.

As illustrated in FIG. 12, the upper metal plate 31 and the lower metal plate 32 are offset in the in-plane direction to expose part of the upper surface of the lower metal plate 32 when seen in the irradiation direction of the laser beam L. To weld the weld portion 35 of the welding target 30 including the upper metal plate 31 and the lower metal plate 32, the laser welding device 10 emits the laser beam L to the welding target 30 from above the welding target 30 along the boundary position between the upper metal plate 31 and the lower metal plate 32.

In this embodiment, the measurement beam S is emitted to a position in front of the center of the optical axis of the laser beam L in the welding direction while gyrating, and the boundary position is detected based on the measured values. The laser welding device 10 performs laser welding while correcting the misalignment of the laser emitting head 20 relative to the detected boundary position. This configuration can increase the accuracy of laser welding and precision of measurement.

In this embodiment, the irradiation position of the measurement beam S gyrates to perform measurement at positions before and after the measurement beam S crosses the boundary position, and whether there is a gap between the upper metal plate 31 and the lower metal plate 32 is determined based on a plurality of measured values.

Figure 13:
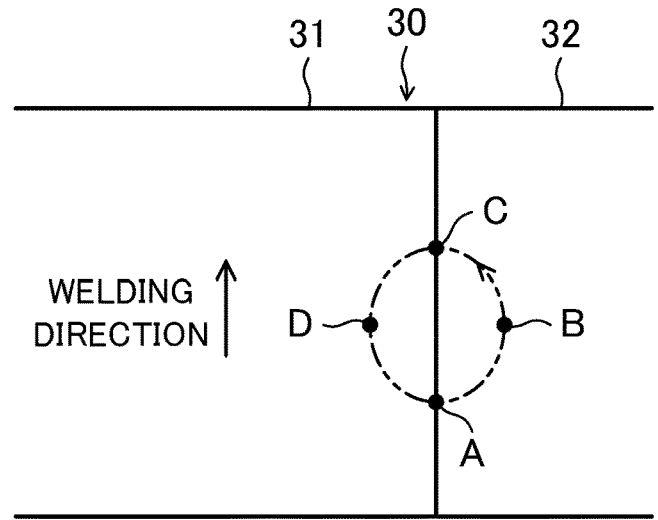
FIG. 13 is a plan view illustrating a spin trajectory of the measurement beam emitted to the upper metal plate and the lower metal plate to cross a boundary position therebetween.

Specifically, as illustrated in FIG. 13, the measurement beam S emitted to the position (point A) of the keyhole 37 gyrates counterclockwise to a position in front of the center of the optical axis of the laser beam L in the welding direction.

In this manner, the measurement beam S is emitted along a path that passes the surface (point B) of the lower metal plate 32, a boundary position (point C) between the upper metal plate 31 and the lower metal plate 32, and the surface (point D) of the upper metal plate 31 in this order. The measurement beam S can therefore measure the depth from a predetermined reference surface at each of point A to point D. The predetermined reference surface is the surface of the upper metal plate 31 as viewed from the irradiation direction of the laser beam L.

Figure 14A:
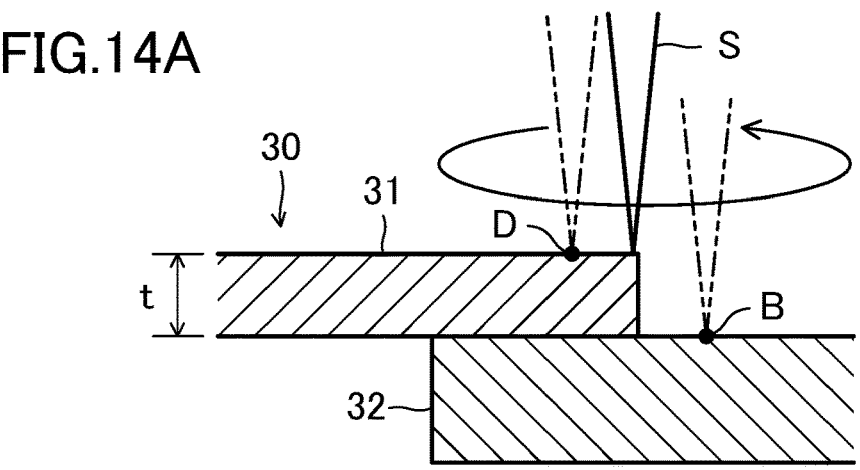
FIG. 14A is a diagram illustrating the measurement beam emitted along a spin trajectory when there is no gap between the workpieces.

In the example illustrated in FIG. 14A, when viewed from the irradiation direction of the laser beam L, the measured value at point B agrees with a value obtained by adding, in the depth direction, a thickness t of the upper metal plate 31 to the measured value at point D. In this regard, the laser welding device 10 can determine that there is no gap g between the upper metal plate 31 and the lower metal plate 32 based on the values measured at positions before and after the measurement beam S crosses the boundary position.

Figure 14B:
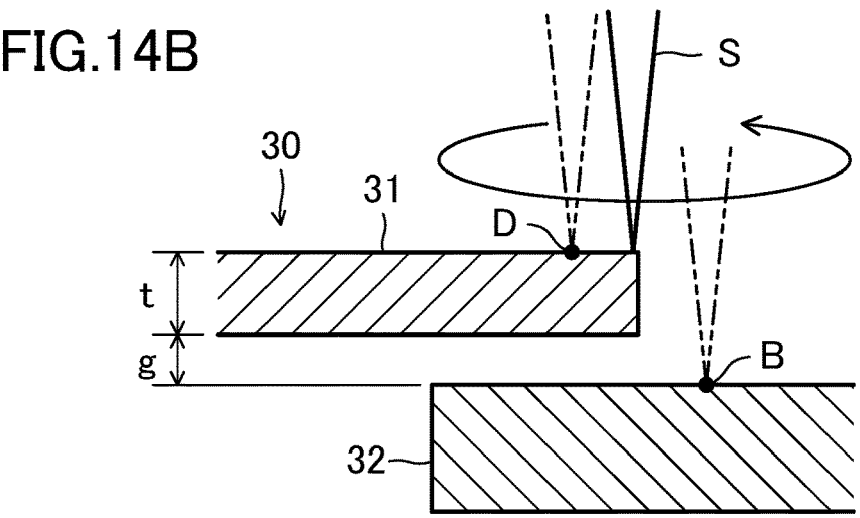
FIG. 14B is a diagram illustrating the measurement beam emitted along a spin trajectory when there is a gap between the workpieces.

In the example illustrated in FIG. 14B, however, the measured value at point B is larger (deeper) in the irradiation direction of the laser beam L than the value obtained by adding, in the thickness direction, the thickness t to the measured value at point D, by an amount of the gap g. Calculating the difference between the measured value and the value obtained by the addition can calculate the gap g as an amount of a gap.

Figure 15:
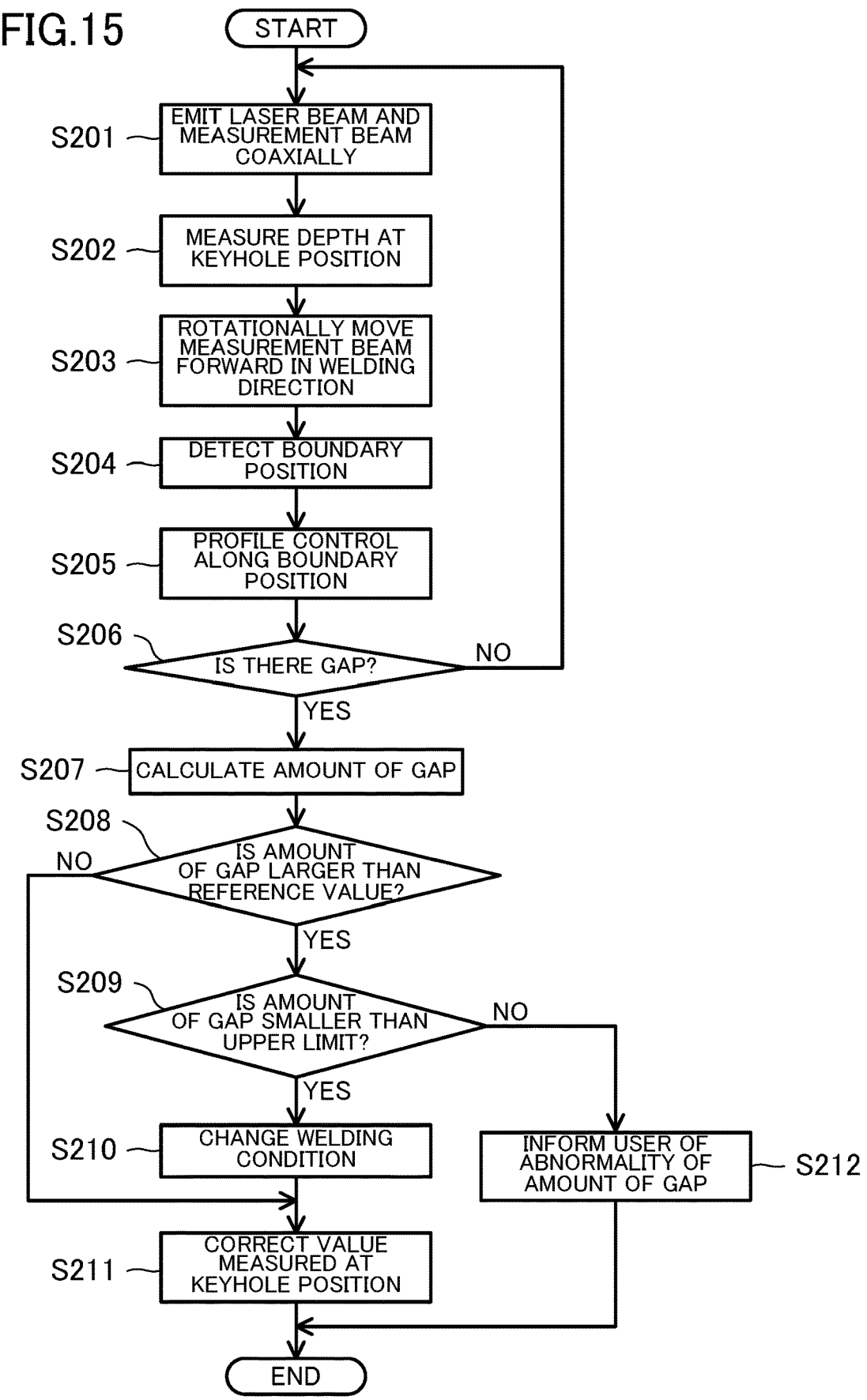
FIG. 15 is a flowchart illustrating the procedure of switching the irradiation position of the measurement beam between the keyhole position and the boundary position.

The following describes the procedure of switching the irradiation position of the measurement beam S between the position of the keyhole 37 and the boundary position with reference to the flowchart illustrated in FIG. 15.

As illustrated in FIG. 15, at Step S201, the laser beam L and the measurement beam S are coaxially aligned with each other in the laser emitting head 20, and the laser emitting head 20 emits the coaxially aligned beams to the weld portion 35. The process proceeds to Step S202.

At Step S202, the measurement unit 14 measures the depth of the position of the keyhole 37 based on the measurement beam S reflected from the bottom of the keyhole 37, and the process proceeds to Step S203.

At Step S203, the irradiation position of the measurement beam S gyrates to cross a boundary position between the upper metal plate 31 and the lower metal plate 32 in front of the center of the optical axis of the laser beam L in the welding direction, and the process proceeds to Step S204.

At Step S204, the measurement unit 14 detects the boundary position based on the measurement beam S reflected from positions before and after the measurement beam S crosses the boundary position, and the process proceeds to Step S205.

At Step S205, profile control is performed to emit the laser beam L along the detected boundary position, and the process proceeds to Step S206.

At Step S206, the determination unit 17 determines whether there is a gap g between the upper metal plate 31 and the lower metal plate 32 based on the measured values measured before and after the measurement beam S crosses the boundary position. If it is YES at Step S206, the process proceeds to Step S207. If it is NO at Step S206, the process returns to Step S201.

At Step S207, an amount of the gap is calculated based on the measured values measured before and after the measurement beam S crosses the boundary position, and the process proceeds to Step S208.

At Step S208, the determination unit 17 determines whether the amount of the gap is larger than a predetermined reference value. If it is YES at Step S208, the process proceeds to Step S209. If it is NO at Step S208, the process proceeds to Step S211.

At Step S209, the determination unit 17 determines whether the amount of the gap is smaller than a predetermined upper limit. If it is YES at Step S209, the process proceeds to Step S210. If it is NO at Step S209, the determination unit 17 determines that the amount of the gap is abnormal and the process proceeds to Step S212.

At Step S210, welding conditions are changed to increase the molten amount of the upper metal plate 31 by, for example, emitting the laser beam L along the spin trajectory and irradiating a broader area. The process proceeds to Step S211.

At Step S211, the measured value of the depth at the position of the keyhole 37 is corrected in accordance with the amount of the gap, and the process is ended.

At Step S212, for example, an alert message indicating abnormality of the measured value is displayed on a display monitor (not illustrated) to inform a user of the abnormality, and the process is ended.

Third Embodiment

Figure 16:
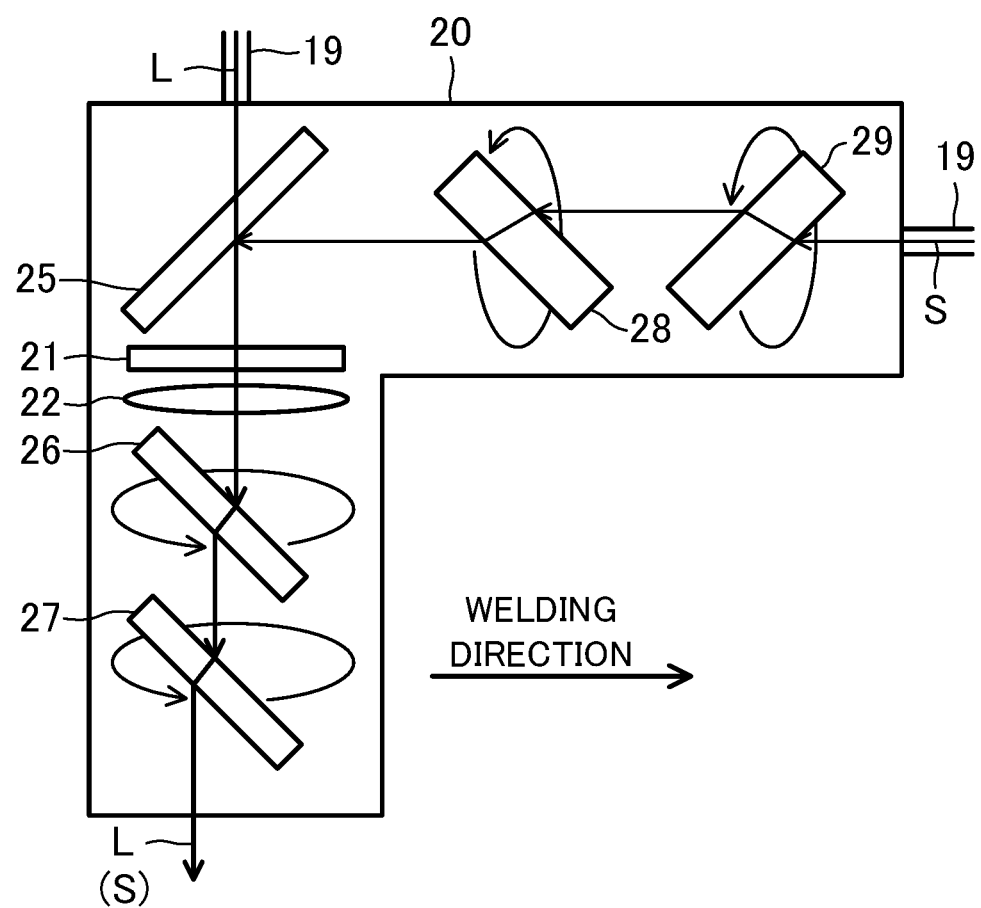
FIG. 16 is a schematic view illustrating a configuration of a laser emitting head according to a third embodiment.

FIG. 16 is a schematic view illustrating a configuration of a laser emitting head according to a third embodiment. As illustrated in FIG. 16, the laser emitting head 20 includes a beam splitter 25 configured to adjust the laser beam L and the measurement beam S to travel in parallel with each other, a collimating lens 21 and a focus lens 22 transmitting the laser beam L and the measurement beam S, a first parallel plate 26, a second parallel plate 27, and a third parallel plate 28 and a fourth parallel plate 29 serving as an irradiation position switching part.

The laser beam L output from the laser oscillator 11 passes through the optical fiber 19 to the laser emitting head 20. The laser beam L enters the laser emitting head 20 and passes through the beam splitter 25.

The measurement beam S output from the optical interferometer 12 passes through the optical fiber 19 to the laser emitting head 20. The measurement beam S enters the laser emitting head 20 and passes through the third parallel plate 28 and the fourth parallel plate 29, at which the position of the measurement beam S incident on the beam splitter 25 is changed.

Figure 17A:
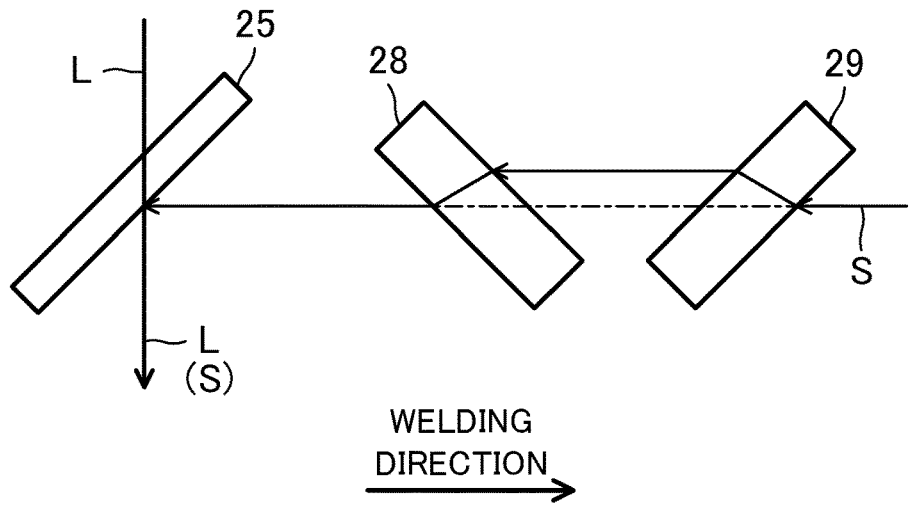
FIG. 17A is a diagram illustrating a configuration in emitting the measurement beam to the keyhole position.

Specifically, when the third parallel plate 28 and the fourth parallel plate 29 are rotated and adjusted to angular positions as illustrated in FIG. 17A, the measurement beam S is directed to a position at which the measurement beam S is coupled with the laser beam L transmitted through the beam splitter 25.

The measurement beam S is concentrically and coaxially aligned with the laser beam L by the beam splitter 25. The coaxially aligned laser beam L and measurement beam S are collimated by the collimating lens 21 and focused by the focus lens 22.

Figure 17B:
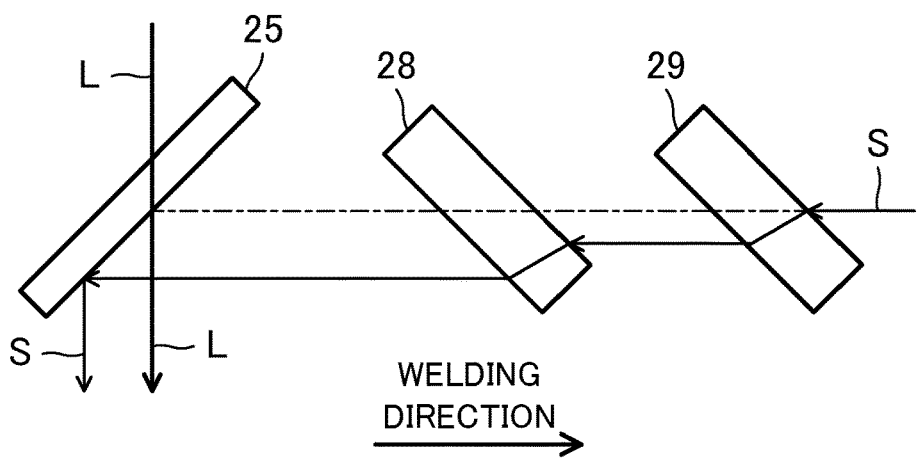
FIG. 17B is a diagram illustrating a configuration in emitting the measurement beam to the weld bead position.

When the third parallel plate 28 and the fourth parallel plate 29 are rotated and adjusted to angular positions as illustrated in FIG. 17B, the measurement beam S is directed to a position behind the position, in the welding direction, of the laser beam L transmitted through the beam splitter 25.

Specifically, in the example illustrated in FIG. 17B, the laser emitting head 20 performs welding while moving rightward, and the measurement beam S is refracted by the beam splitter 25 at a position behind (at the left side of) the position of the laser beam L in the welding direction. The measurement beam S then travels in parallel with the laser beam L. The laser beam L and the measurement beam S are collimated by the collimating lens 21 and focused by the focus lens 22.

Figure 17C:
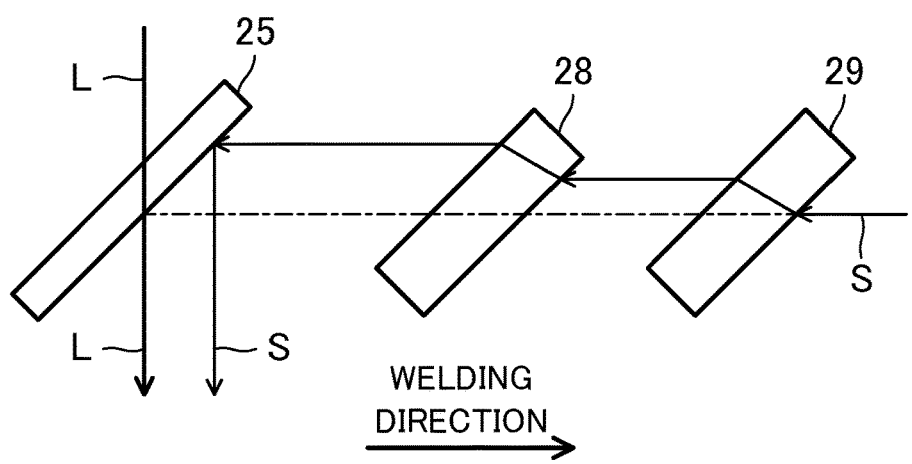
FIG. 17C is a diagram illustrating a configuration in emitting the measurement beam to a boundary position disposed frontward in the welding direction.

When the third parallel plate 28 and the fourth parallel plate 29 are rotated and adjusted to angular positions as illustrated in FIG. 17C, the measurement beam S is directed to a position in front of the position, in the welding direction, of the laser beam L transmitted through the beam splitter 25.

Specifically, in the example illustrated in FIG. 17C, the laser emitting head 20 performs welding while moving rightward, and the measurement beam S is refracted by the beam splitter 25 at a position in front of (at the right side of) the position of the laser beam L in the welding direction. The measurement beam S then travels in parallel with the laser beam L. The laser beam L and the measurement beam S are collimated by the collimating lens 21 and focused by the focus lens 22.

In this embodiment, the third parallel plate 28 and the fourth parallel plate 29 are disposed closer to the beam entrance of the measurement beam S than the beam splitter 25. Rotating the third parallel plate 28 and the fourth parallel plate 29 rotates the measurement beam S along a circular trajectory, whereby the measurement beam S can gyrate.

With this configuration, the irradiation position of the measurement beam S can be switched among the keyhole position coaxial with the optical axis of the laser beam L, a position behind the center of the optical axis of the laser beam L in the welding direction, and a position in front of the center of the optical axis of the laser beam L in the welding direction.

Fourth Embodiment

Figure 18:
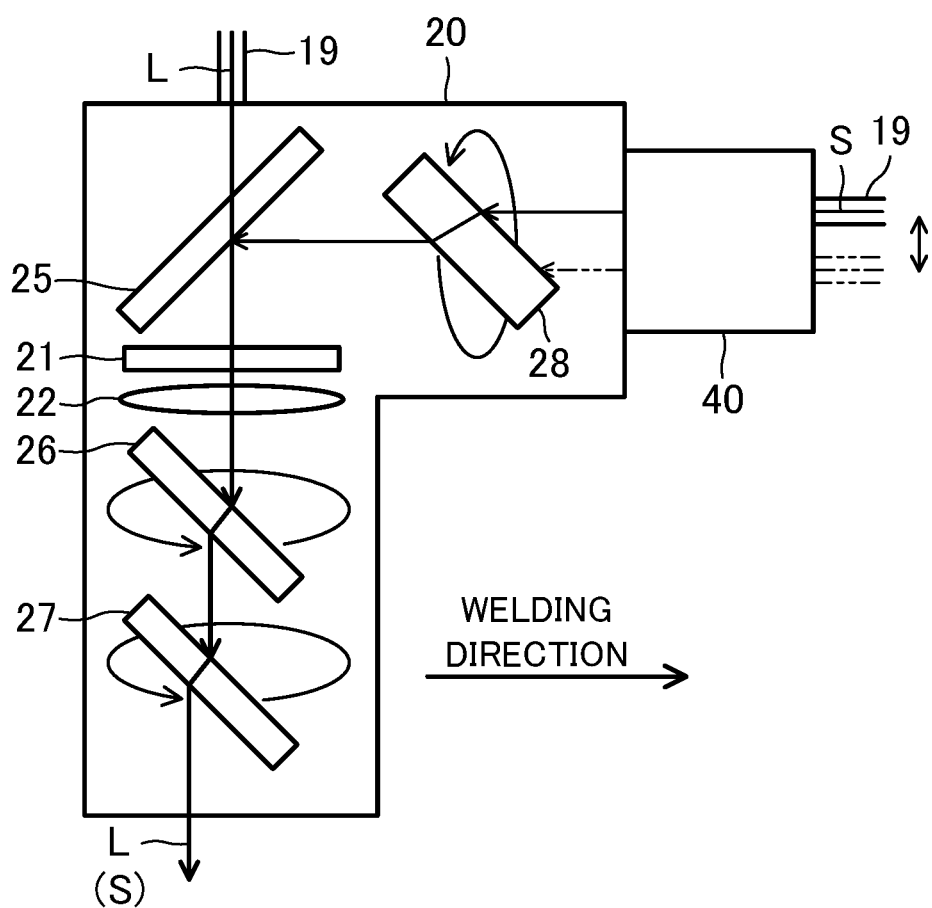
FIG. 18 is a schematic view illustrating a configuration of a laser emitting head according to a fourth embodiment.

FIG. 18 is a schematic view illustrating a configuration of a laser emitting head according to a fourth embodiment. As illustrated in FIG. 18, the laser emitting head 20 includes a beam splitter 25 configured to adjust the laser beam L and the measurement beam S to travel in parallel with each other, a collimating lens 21 and a focus lens 22 transmitting the laser beam L and the measurement beam S, a first parallel plate 26, a second parallel plate 27, a third parallel plate 28, and an irradiation position switching unit 40.

The laser beam L output from the laser oscillator 11 passes through the optical fiber 19 to the laser emitting head 20. The laser beam L enters the laser emitting head 20 and passes through the beam splitter 25.

The irradiation position switching unit 40 is configured to adjust the position of the optical axis of the optical fiber 19, and is disposed at a beam entrance end portion of the laser emitting head 20. The measurement beam S output from the optical interferometer 12 passes through the optical fiber 19 and via the irradiation position switching unit 40 to the laser emitting head 20. The measurement beam S passes through the irradiation position switching unit 40, at which the position of the measurement beam S incident on the third parallel plate 28 in the laser emitting head 20 is changed.

Figure 19:
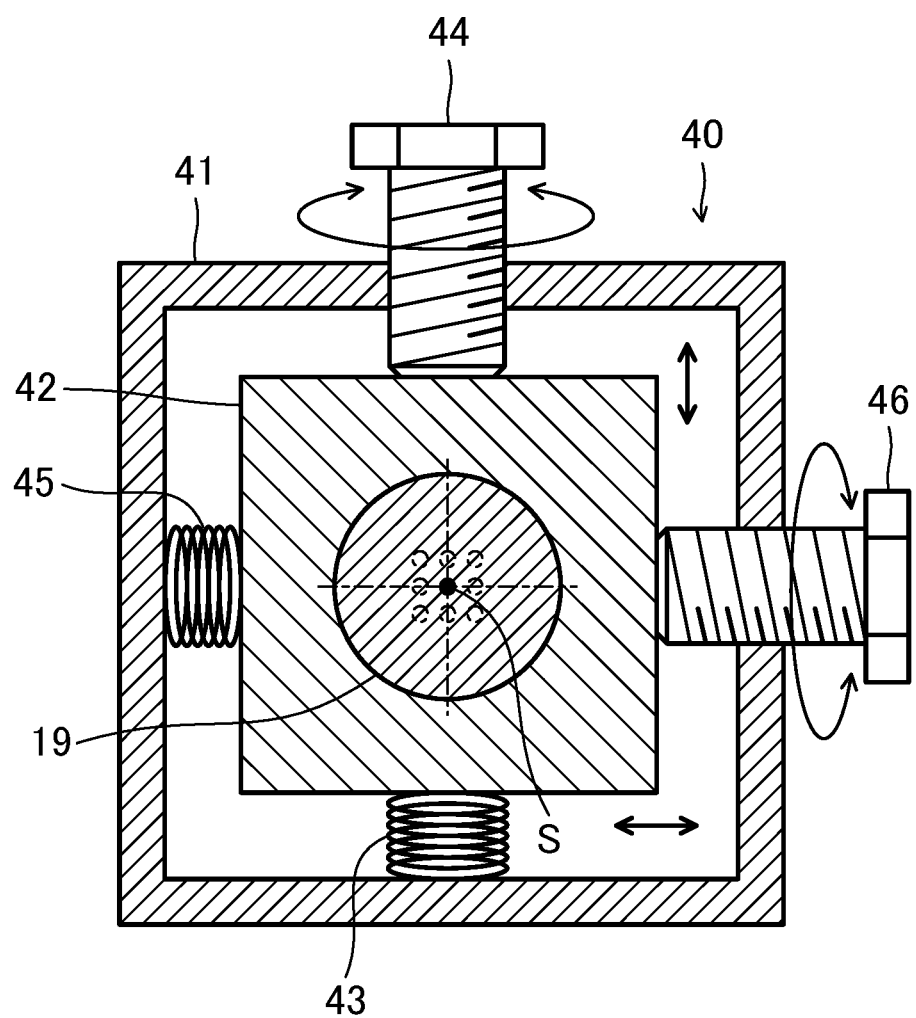
FIG. 19 is a diagram illustrating a configuration of an irradiation position switching unit.

Specifically, as illustrated in FIG. 19, the irradiation position switching unit 40 includes a frame 41, a holder 42 disposed inside the frame 41 for holding the optical fiber 19, and a first biasing spring 43, a first adjustment screw 44, a second biasing spring 45, and a second adjustment screw 46 for adjusting the position of the holder 42 in the frame 41.

In FIG. 19, the first biasing spring 43 is disposed between a lower surface of the holder 42 and an inner surface of the frame 41 to urge the holder 42 upward. The first adjustment screw 44 is disposed opposite to the first biasing spring 43 across the holder 42 and screwed into the frame 41.

The holder 42 can be moved upward or downward by adjusting the amount of tightening of the first adjustment screw 44, with the distal end of the first adjustment screw 44 slidably pressing an upper surface of the holder 42.

In FIG. 19, the second biasing spring 45 is disposed between a left side surface of the holder 42 and an inner surface of the frame 41 to urge the holder 42 rightward. The second adjustment screw 46 is disposed opposite to the second biasing spring 45 across the holder 42 and screwed into the frame 41.

The holder 42 can be moved leftward or rightward by adjusting the amount of tightening of the second adjustment screw 46, with the distal end of the second adjustment screw 46 slidably pressing a right side surface of the holder 42.

In this manner, the irradiation position of the measurement beam S can be switched among the keyhole position coaxial with the optical axis of the laser beam L, a position behind the center of the optical axis of the laser beam L in the welding direction, and a position in front of the center of the optical axis of the laser beam L in the welding direction.

Fifth Embodiment

Figure 20:
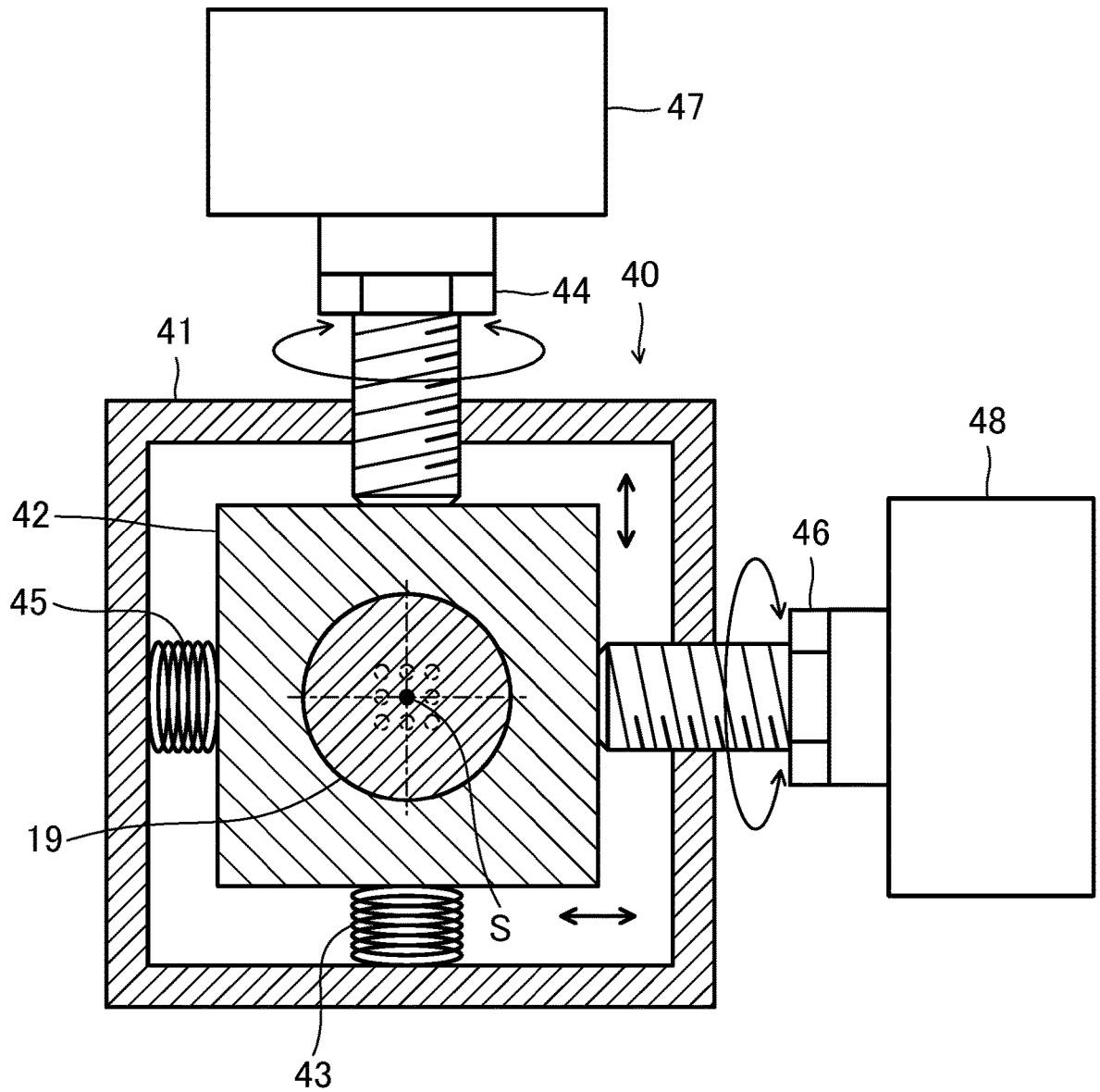
FIG. 20 is a diagram illustrating a configuration of an irradiation position switching unit of a laser emitting head according to a fifth embodiment.

FIG. 20 is a diagram illustrating a configuration of an irradiation position switching unit of a laser emitting head according to a fifth embodiment. In the following description, components that are the same as those of the fourth embodiment are given the same reference characters and only the differences will be described.

As illustrated in FIG. 20, a rotating shaft of a first motor 47 is connected to the head of the first adjustment screw 44.

The holder 42 can be moved upward or downward by rotating the first motor 47 and adjusting the amount of tightening of the first adjustment screw 44.

A rotating shaft of a second motor 48 is connected to the head of the second adjustment screw 46. The holder 42 can be moved leftward or rightward by rotating the second motor 48 and adjusting the amount of tightening of the second adjustment screw 46.

In this manner, the irradiation position of the measurement beam S can be switched among the keyhole position coaxial with the optical axis of the laser beam L, a position behind the center of the optical axis of the laser beam L in the welding direction, and a position in front of the center of the optical axis of the laser beam L in the welding direction.

Sixth Embodiment

Figure 21:
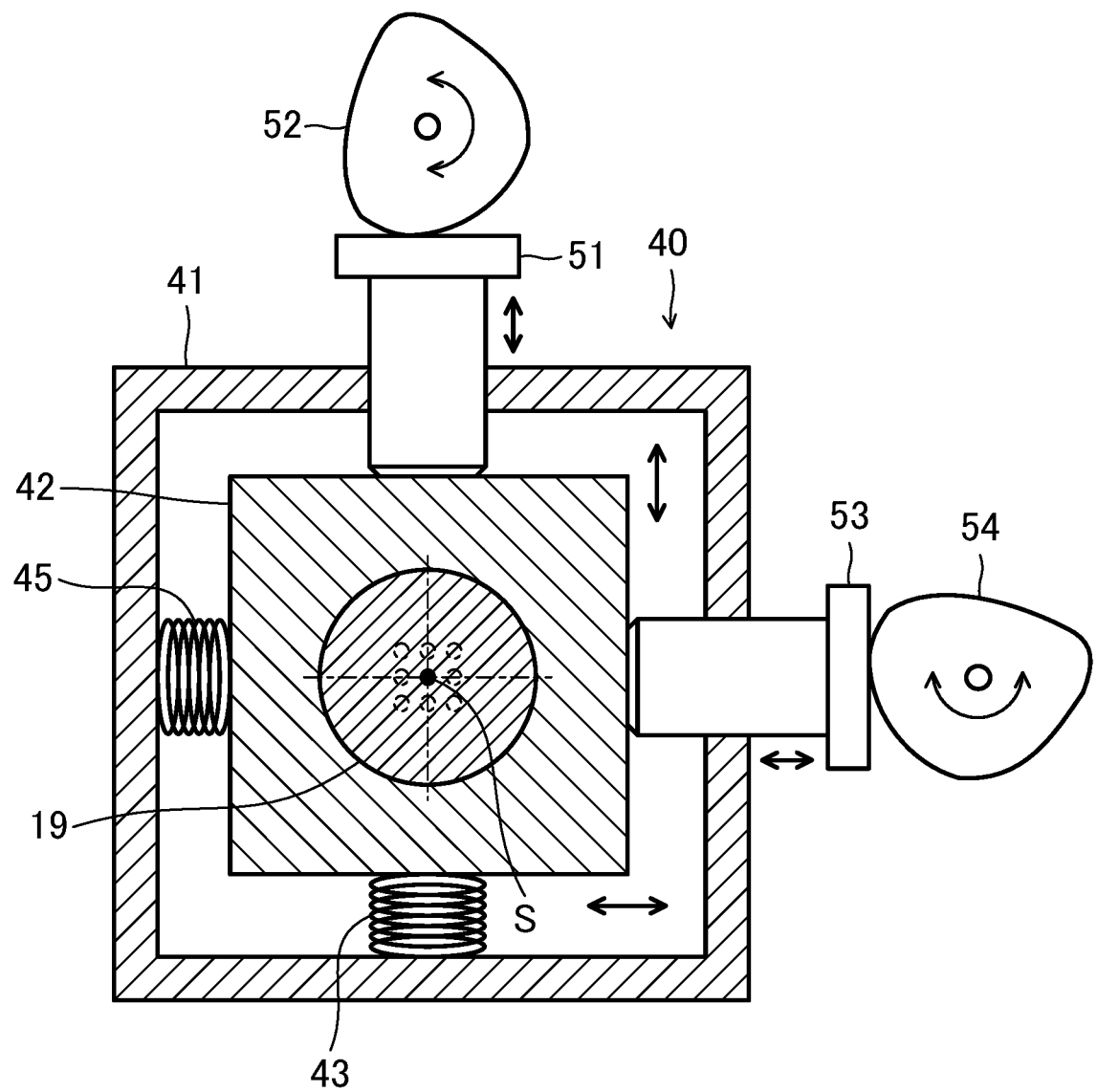
FIG. 21 is a diagram illustrating a configuration of an irradiation position switching unit of a laser emitting head according to a sixth embodiment.

FIG. 21 is a diagram illustrating a configuration of an irradiation position switching unit of a laser emitting head according to a sixth embodiment. As illustrated in FIG. 21, the irradiation position switching unit 40 includes a frame 41, a holder 42 disposed inside the frame 41 for holding the optical fiber 19, and a first biasing spring 43, a first shaft 51, a first cam 52, a second biasing spring 45, a second shaft 53, and a second cam 54 for adjusting the position of the holder 42 in the frame 41.

In FIG. 21, the first biasing spring 43 is disposed between a lower surface of the holder 42 and an inner surface of the frame 41 to urge the holder 42 upward. The first shaft 51 is disposed opposite to the first biasing spring 43 across the holder 42 and is slidably fitted in the frame 41 so that the first shaft 51 can move upward and downward relative to the frame 41. The head of the first shaft 51 protrudes from the frame 41. The head of the first shaft 51 abuts a cam surface of the first cam 52.

The holder 42 can be moved upward or downward by rotating the first cam 52 and moving the first shaft 51 upward or downward along the cam surface, with the distal end of the first shaft 51 slidably pressing an upper surface of the holder 42.

In FIG. 21, the second biasing spring 45 is disposed between a left side surface of the holder 42 and an inner surface of the frame 41 to urge the holder 42 rightward. The second shaft 53 is disposed opposite to the second biasing spring 45 across the holder 42 and is slidably fitted in the frame 41 so that the second shaft 53 can move rightward and leftward relative to the frame 41. The head of the second shaft 53 protrudes from the frame 41. The head of the second shaft 53 abuts a cam surface of the second cam 54.

The holder 42 can be moved leftward or rightward by rotating the second cam 54 and moving the second shaft 53 leftward or rightward along the cam surface, with the distal end of the second shaft 53 slidably pressing a right side surface of the holder 42.

In this manner, the irradiation position of the measurement beam S can be switched among the keyhole position coaxial with the optical axis of the laser beam L, a position behind the center of the optical axis of the laser beam L in the welding direction, and a position in front of the center of the optical axis of the laser beam L in the welding direction.

Other Embodiments

The embodiments described above may be modified as follows.

The laser welding device according to the embodiments above includes the laser emitting head 20 including optical elements such as the third parallel plate 28 to move the irradiation position of the measurement beam S. However, the laser welding device may include an optical device such as a galvanometer scanner configured to emit the measurement beam S for scanning as long as the optical device can change the irradiation position of the laser beam along a spiral path.

The embodiments of the present invention can have a highly practical effect of measuring the depth of the keyhole position and determining the state of overlapping workpieces, and are therefore significantly useful and have high industrial applicability.

What is claimed is:

1. A laser welding device configured to weld two overlapping workpieces by emitting a laser beam to the workpieces to form a weld bead, the laser welding device comprising:
    an irradiation unit configured to emit, to the workpieces, the laser beam and a measurement beam having a wavelength different from a wavelength of the laser beam;
    a measurement unit configured to measure a depth from a predetermined reference surface based on the measurement beam emitted by the irradiation unit and reflected from the workpieces;
    an irradiation position switching part configured to switch an irradiation position of the measurement beam between a keyhole position coaxial with an optical axis of the laser beam and a weld bead position behind a center of the optical axis of the laser beam in a welding direction, wherein the weld bead has a surface where a recess is formed; and
    a controller configured to determine an amount of a gap between the two workpieces based on a measured value of a recess depth measured at the weld bead position, by making a comparison with recess depth previously measured in a state where there is no gap between the two workpieces.

2. The laser welding device of claim 1, wherein the controller is further configured to correct, based on the amount of the gap, a measured value measured at the keyhole position.

3. The laser welding device of claim 1, wherein the controller is configured to change a welding condition to increase a molten amount of the workpieces when the amount of the gap is larger than a predetermined reference value by increasing the output of the laser beam, reducing the welding speed, or emitting the laser beam along a spin trajectory.

4. The laser welding device of claim 1, wherein, if the amount of the gap is larger than a predetermined upper limit, the controller determines that the amount of the gap is abnormal.

5. A laser welding device configured to weld two overlapping workpieces by emitting a laser beam to the workpieces,
    the two workpieces being offset in an in-plane direction to expose part of one of the workpieces behind the other workpiece as viewed from an irradiation direction of the laser beam, the laser welding device comprising:
    an irradiation unit configured to emit, to the workpieces, the laser beam and a measurement beam having a wavelength different from a wavelength of the laser beam;
    a measurement unit configured to measure a depth from a predetermined reference surface based on the measurement beam emitted by the irradiation unit and reflected from the workpieces;
    an irradiation position switching part configured to switch an irradiation position of the measurement beam between a keyhole position coaxial with an optical axis of the laser beam and a boundary position between the two workpieces in front of a center of an optical axis of the laser beam in a welding direction; and
    a controller configured to determine an amount of a gap between the two workpieces based on a plurality of measured values measured before and after the measurement beam crosses the boundary position,
    wherein the irradiation position switching part switches the irradiation position of the measurement beam such that the irradiation position gyrates around a center of rotation moving along a predetermined welding path.

6. The laser welding device of claim 5, wherein the controller is further configured to correct, based on the amount of the gap, a measured value measured at the keyhole position.

7. The laser welding device of claim 5, wherein
    if the amount of the gap is larger than a predetermined upper limit, the controller determines that the amount of the gap is abnormal.

* * * * *